United States Patent
Geiger et al.

(10) Patent No.: US 9,608,950 B2
(45) Date of Patent: Mar. 28, 2017

(54) SYSTEMS AND METHODS FOR SHARING VIDEOS AND IMAGES IN A TEXTING ENVIRONMENT

(71) Applicant: BLEND SYSTEMS, INC., Los Altos, CA (US)

(72) Inventors: Matthew J. Geiger, South San Francisco, CA (US); Akash R. Nigam, San Francisco, CA (US); Evan K. Rosenbaum, San Francisco, CA (US)

(73) Assignee: Blend Systems, Inc., San Francisco, CA (US)

( * ) Notice: Subject to any disclaimer, the term of this patent is extended or adjusted under 35 U.S.C. 154(b) by 0 days.

(21) Appl. No.: 14/829,278

(22) Filed: Aug. 18, 2015

(65) Prior Publication Data
US 2017/0054663 A1 Feb. 23, 2017

(51) Int. Cl.
| | |
|---|---|
| H04L 12/58 | (2006.01) |
| H04L 12/18 | (2006.01) |
| G06F 3/0481 | (2013.01) |
| G06F 3/0482 | (2013.01) |

(52) U.S. Cl.
CPC ............ *H04L 51/10* (2013.01); *G06F 3/0482* (2013.01); *G06F 3/04817* (2013.01); *H04L 51/046* (2013.01)

(58) Field of Classification Search
None
See application file for complete search history.

(56) References Cited

U.S. PATENT DOCUMENTS

| | | | |
|---|---|---|---|
| 9,063,638 | B1 | 6/2015 | Schrock et al. |
| 2003/0134678 | A1* | 7/2003 | Tanaka ............... A63F 13/00 463/42 |
| 2005/0027802 | A1 | 2/2005 | Madsen et al. |

(Continued)

FOREIGN PATENT DOCUMENTS

WO WO 2015/050966 A1 4/2015

OTHER PUBLICATIONS

Ahдрей И baxob , "Weeve app—awesome short social video application"; Publication date: Mar. 4, 2015; https://www.youtube.com/watch?v=4m-eIDSN0Es (documented by Nhat-Huy Nguyen on Jan. 8, 2016).*

(Continued)

*Primary Examiner* — Jeffrey A Gaffin
*Assistant Examiner* — Nhat-Huy T Nguyen

(57) ABSTRACT

An electronic device displays an image or video associated with a session of a messaging application. The device displays a message received from a user associated with the session over the image or video. In response to receiving a second message, the device displaces display of the first message with display of the second message, and displays the first message at a second location, also over the image or video. The device also displays an image icon associated with the image or video over the image or video. In response to receiving a second image or video, the device displays a second image icon over the first image or video. In response to the user selecting the second image or video, the device replaces display of the first image or video with the second image or video, while maintaining the display of the messages and image icons.

27 Claims, 26 Drawing Sheets

(56) References Cited

U.S. PATENT DOCUMENTS

| | | |
|---|---|---|
| 2006/0150119 A1 | 7/2006 | Chesnais et al. |
| 2008/0316542 A1 | 12/2008 | Mindrum et al. |
| 2009/0089372 A1* | 4/2009 | Sacco ................. G06F 17/3089 709/204 |
| 2009/0147803 A1 | 6/2009 | Takayama |
| 2009/0282241 A1 | 11/2009 | Prafullchandra et al. |
| 2012/0063736 A1* | 3/2012 | Simmons ........... H04N 21/4788 386/224 |
| 2013/0013717 A1 | 1/2013 | Buchheit et al. |
| 2013/0086615 A1 | 4/2013 | Williams et al. |
| 2013/0185635 A1 | 7/2013 | Barzel et al. |
| 2013/0332856 A1* | 12/2013 | Sanders ................ G06F 3/0481 715/753 |
| 2014/0019882 A1* | 1/2014 | Chew .................... G06Q 10/10 715/753 |
| 2014/0085334 A1 | 3/2014 | Payne |
| 2014/0136990 A1 | 5/2014 | Gonnen et al. |
| 2015/0149494 A1 | 5/2015 | Jason |
| 2015/0172238 A1 | 6/2015 | Ahmed et al. |

OTHER PUBLICATIONS

Chime Chat by String Theory, iTunes Store, Retrieved from the Internet: https://itunes.apple.com/us/app/string-by-string-theory/id936278210?mt=8, accessed Aug. 18, 2015.

U Messenger—Photo Chat, Google play, Retrieved from the Internet: https://play.google.com/store/apps/details?id=com.cyberlink.U&hl=en, accessed Aug. 18, 2015.

Weev, iTunes Store, Retrieved from the Internet: https://itunes.apple.com/us/app/weev/id669729170?mt=8, accessed Aug. 18, 2015.

Weev, Facebook, Retrieved from the Internet: https://www.facebook.com/weev.net, accessed Aug. 18, 2015.

International Search Report for or International Patent Application No. PCT/US2016/037450, mailed Sep. 27, 2016, 3 pages.

* cited by examiner

400

402 Display a first digital image or video on a display, while a messaging application is in a first messaging display mode. The first digital image or video associated with a first session of the messaging application. The first session is established by a first originator of the first session and includes a first predefined plurality of users identified by the first originator upon initiation of the first session. The first originator is in the first predefined plurality of users.

404 The first digital image or video is a first digital video.

406 Displaying the first digital video includes playing the video on a recurring basis on the display without human intervention.

408 The first predefined plurality of users have collectively uploaded a first plurality of digital images or videos to the first session, including the first and second image or video:

410 Sequentially display the first plurality of digital images or videos, based on the temporal order in which they were uploaded to the first session.

412 While the first electronic device is logged into a first instance of the first session, display a respective digital image or video in the first plurality of digital images or videos in an asynchronous manner. The identity of the respective digital image or video being displayed at a given time is independent of the identity of a respective digital image or video in the first plurality of images or videos being displayed contemporaneously at a second instance of the first session that is associated with a second user in the first predefined plurality of users.

414 The first session persists for each respective user in the first predetermined plurality of users across periods of time when respective users are logged out of the first messaging application.

Figure 4A

402 Display a first digital image or video on a display, while a messaging application is in a first messaging display mode. The first digital image or video associated with a first session of the messaging application. The first session is established by a first originator of the first session and includes a first predefined plurality of users identified by the first originator upon initiation of the first session. The first originator is in the first predefined plurality of users.

(B)

416 The first predefined plurality of users have collectively directed a first plurality of messages to the first session, including the first and second messages:

418 While the first electronic device is logged into a first instance of the first session, display at least the last M messages in the first plurality of messages that had been directed to the first session by the first plurality of predefined users without human intervention in a synchronous manner. The identity of the M messages in the first plurality of messages being displayed at a given time in the first instance of the first session is the same as the identity of the M messages in the first plurality of messages displayed at contemporaneously at the second instance of the first session.

420 The value of M is dependent on a display mode of the messaging application.

422 The first predefined plurality of users cannot be changed after the originator establishes the first session.

486 The first predefined plurality of users have collectively directed a first plurality of messages to the first session, including the first and second messages. The predefined plurality of users have collectively uploaded a first plurality of images or videos to the first session, including the first and second image or video. While in the first messaging display mode, display a first predefined number of messages in the plurality messages, a digital image or video in the plurality of digital images or videos, and a display toggle icon corresponding to a second messaging display mode of the messaging application.

487 Responsive to detecting a sixth user input at a location on the display corresponding to display of the display toggle icon, enter the second messaging display mode, including display of a second predefined number of messages in the first plurality of messages. Each respective message in the second predefined number of messages is displayed at a location on the display corresponding to display of the displayed digital image or video. The second predefined number of messages is greater than the first predefined number of messages.

488 While in the first messaging display mode, direct the electronic device to display the last three messages in the first plurality of messages that had been communicated to the first session by the first plurality of predefined users.

489 While in the second messaging display mode, direct the first electronic device to display the last N messages in the first plurality of messages that had been communicated to the first session, at different locations on the display, wherein N is a positive integer large enough to ensure that the last N messages cover substantively all of the display.

Figure 4I

SYSTEMS AND METHODS FOR SHARING VIDEOS AND IMAGES IN A TEXTING ENVIRONMENT

TECHNICAL FIELD

This relates generally to methods and devices including, but not limited to, battery operated mobile devices, optionally including digital cameras, that seamlessly blend videos and images with messages in a texting environment.

BACKGROUND

With the growth of the Internet and wireless communication technologies, mobile messaging, such as texting and instant messaging (e.g., chatting), has become a ubiquitous form of communication. As mobile messaging has grown in popularity, new features have been developed to enhance the experience. For example, users can exchange text messages, emojis, photos, videos, music, audio messages, web links, GPS locations, and documents (PDFs, word processing files, etc.). However, the experience of sharing messages and emojis in concert with digital images and videos with a distribution group is tedious, particularly as the distribution group grows large and includes many disjoint conversation threads. As such, convention methods of blending images and videos with text chat typically requires users to back reference, often by scrolling through long historical message trails, to find images and videos that are the subject of current conversation.

Accordingly, there is a need for electronic devices and methods that provide faster, more convenient methods to blend videos or images with message conversations in a texting environment.

SUMMARY

The present disclosure details electronic devices and methods that provide faster, more convenient methods for blending videos or images with message conversations in a texting environment. Such methods and interfaces optionally complement or replace conventional methods for sharing videos, images, and messages. Such methods and interfaces reduce the cognitive burden on a user and produce a more efficient human-machine interface. For battery-operated devices, such methods and interfaces conserve power and increase the time between battery charges.

As such, the above-identified deficiencies and other problems associated with conventional user interfaces for electronic devices with, for example, touch-sensitive surfaces, are reduced or eliminated by the disclosed devices and methods. In some embodiments, the disclosed device is a desktop computer. In some embodiments, the disclosed device is portable (e.g., a notebook computer, tablet computer, or handheld device). In some embodiments, the disclosed device has a touchpad. In some embodiments, the disclosed device has a touch-sensitive display (also known as a "touch screen" or "touch-screen display").

In some embodiments, the disclosed device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. Executable instructions for performing these functions are, optionally, included in a non-transitory computer readable storage medium or other computer program product configured for execution by one or more processors.

In accordance with some embodiments, a method is performed at an electronic device with one or more processors, memory, and a display. The method includes displaying a first digital image or video on the display while a messaging application is in a first messaging display mode. The first digital image or video is associated with a first session of the messaging application. The first session is established by a first originator of the first session and includes a first predefined plurality of users identified by the first originator upon initiation of the first session. The first originator is in the first predefined plurality of users.

In some embodiments, additional users may be added to the session after it has been initiated. In an example of such embodiments, the first predefined plurality of users includes users identified by the originator upon initiation of the first session and users added to the first session (e.g., by the originator and/or other users of the session).

The method includes receiving a first message specifically designated for the first session from a first user in the first predefined plurality of users. Responsive to this first receipt event, the first message is displayed at a first location of the display at a time when the first digital image or video is also displaying. This first location overlays the first digital image or video and thus the first message overlays the first digital image or video.

The method further includes receiving a second message specifically designated for the first session from a second user in the first predefined plurality of users at a time when the first digital image or video is displaying. Responsive to this second receipt event, the displayed first message is displaced by a concomitant display of the second message at the first location. The first message, in turn, is moved to a second location on the display that also overlays the first digital image or video.

The method further includes displaying, at a time when the first digital image or video is displaying, a first image icon corresponding to the first digital image or video at a third location on the display that overlays the first digital image or video.

The method further includes receiving a second digital image or video from a third user in the first predefined plurality of users. In response, a second image icon corresponding to the second digital image or video is displayed at a fourth location on the display that overlays the first digital image or video.

The method also includes detecting a first user input at a location corresponding to display of the second image icon at a time when the first digital image or video is displaying, the first and second message are displayed, and the first and second image icons are displayed. Responsive to this, display of the first digital image or video is displaced with display of the second digital image or video, display of the first and second message is maintained, and display of the first and second image icons is also maintained.

In some embodiments, display of the first digital image is displaced with display of the second digital image or video automatically (e.g., without detecting a user input at a location corresponding to display of the image icon, in other words, without human intervention). In one such example, the device automatically cycles through a plurality of digital images or videos that have been uploaded to the session. In some embodiments, display of the first and second messages, and first and second image icons, is still maintained when the device is automatically cycling through the plurality of digital images or videos, to allow the user to manually change the display to a particular digital image or video.

In accordance with some embodiments, an electronic device includes a display, one or more processors, memory, and one or more programs. The one or more programs are stored in the memory and are configured to be executed by the one or more processors. The one or more programs include instructions for performing or causing performance of the operations of any of the methods described herein.

In accordance with some embodiments, a nontransitory computer readable storage medium has stored therein instructions which when executed by an electronic device with a display, a memory, and one or more processors to execute one or more programs stored in the memory, cause the device to perform or cause performance of the operations of any of the methods described herein.

In accordance with some embodiments, a graphical user interface on an electronic device with a display, a memory, and one or more processors to execute one or more programs stored in the memory, includes one or more of the elements displayed in any of the methods described herein, which are updated in response to inputs, as described in any of the methods described herein.

Thus, electronic devices with displays are provided with faster, more efficient methods and interfaces for blending videos and images with messages in a texting environment, thereby increasing the effectiveness, efficiency, and user satisfaction with such devices. Such methods and interfaces may complement or replace conventional methods for sharing videos, images, and messages

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 4A, 4B, 4C, 4D, 4E, 4F, 4G, 4H, 4I, 4J, and 4K are flow diagrams collectively illustrating a method of blending videos and images with messages in a texting environment in accordance with some embodiments.

DESCRIPTION OF EMBODIMENTS

Figure 1:
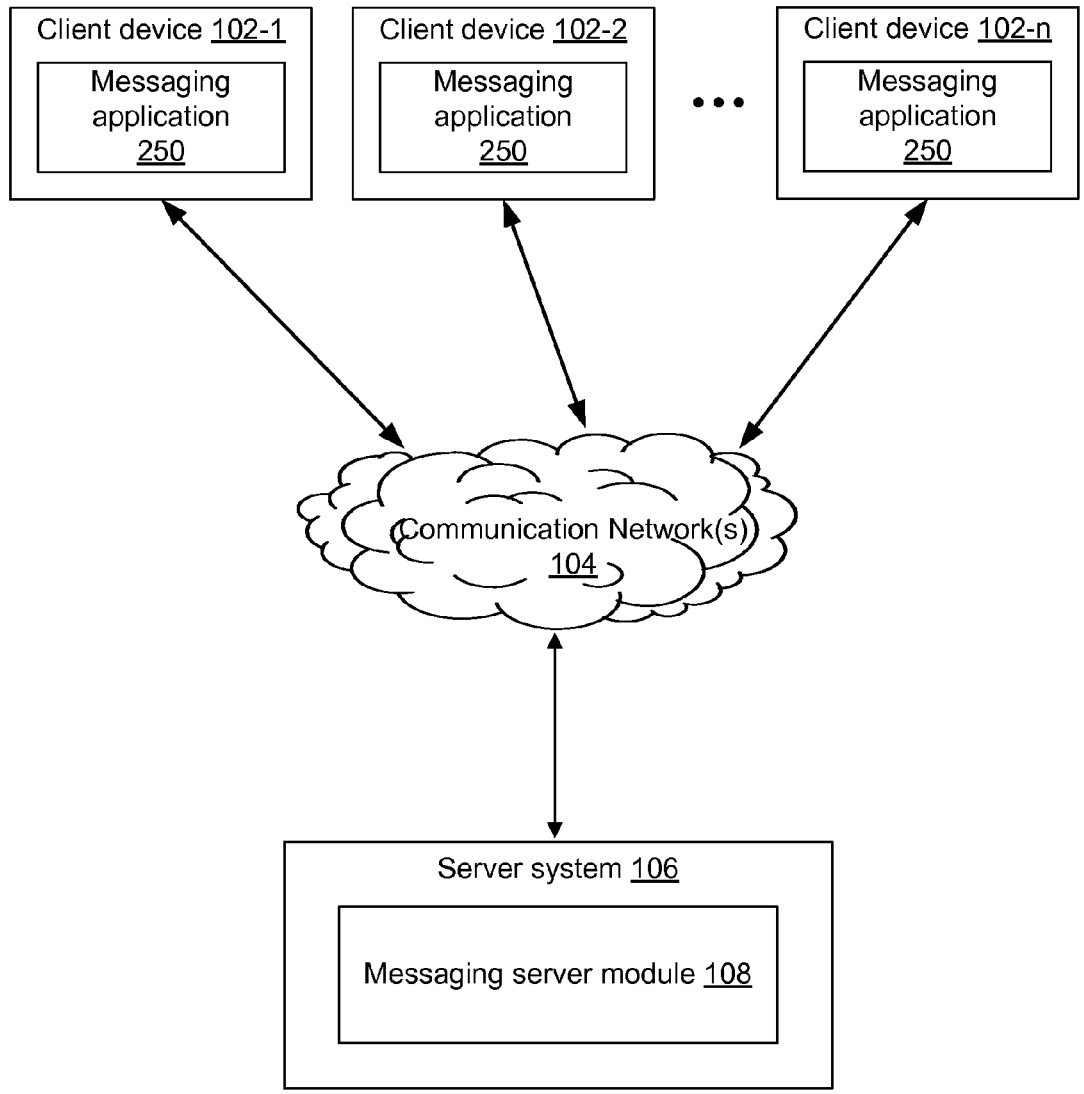
FIG. 1 illustrates a network architecture in accordance with some implementations.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first message could be termed a second message, and, similarly, a second message could be termed a first message, without departing from the scope of the present disclosure. The first message and the second message are both messages, but they are not the same message.

The terminology used in the present disclosure is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "exemplary" is used in the sense of "serving as an example, instance, or illustration" and not in the sense of "representing the best of its kind."

Embodiments of electronic devices, user interfaces for such devices, and associated processes for using such devices are described. In some embodiments, the device is a portable communications device, such as a mobile telephone, that also contains other functions, such as PDA and/or music player functions. Other portable electronic devices, such as laptops or tablet computers are, optionally, used. It should also be understood that, in some embodiments, the device is not a portable communications device, but is a desktop computer.

A detailed description of a system 100 for sharing images, videos, and messages, in accordance with the present disclosure, is described in conjunction with FIGS. 1 through 5L.

Figure 2:
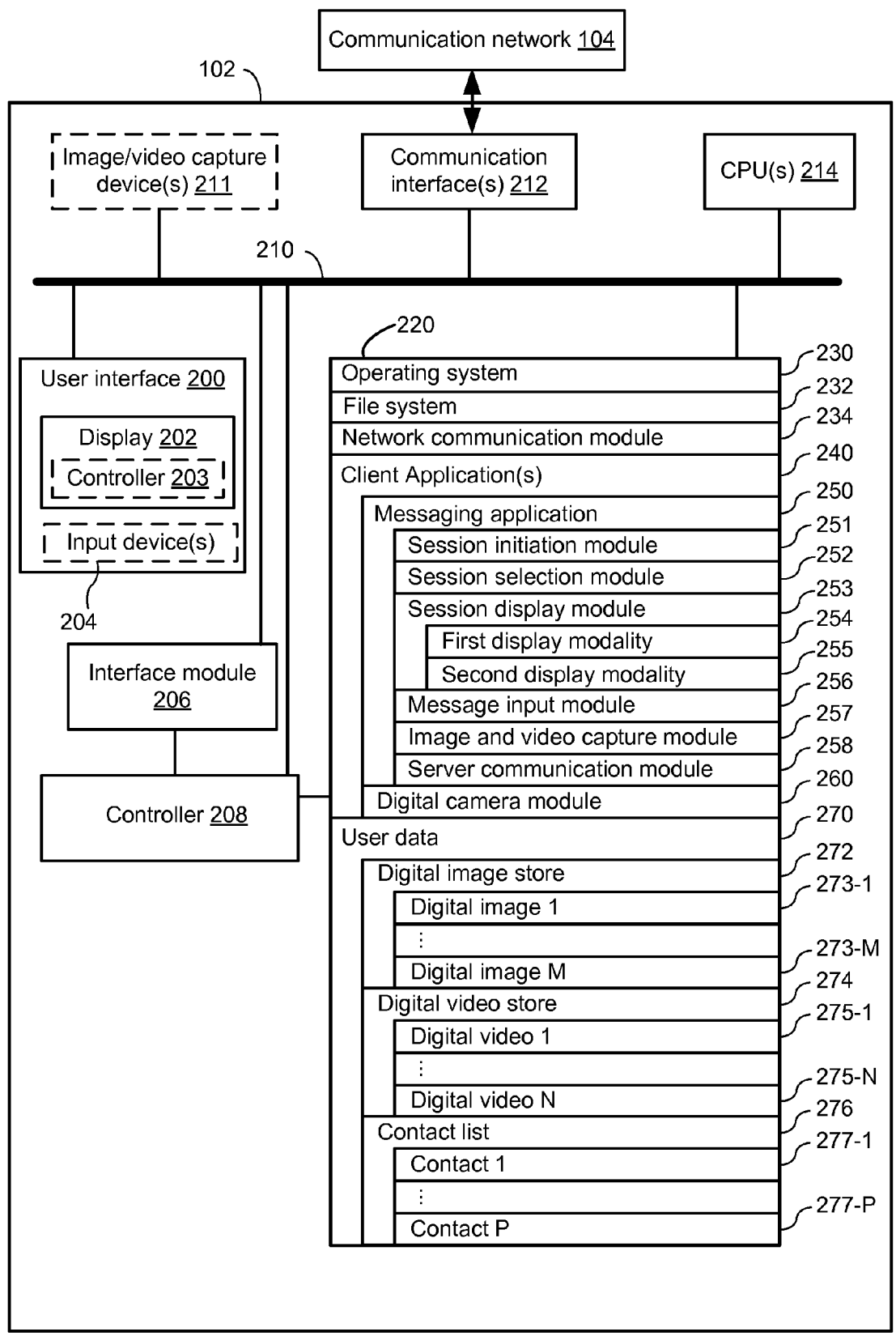
FIG. 2 is a block diagram illustrating an electronic client device in accordance with some embodiments.

In particular, FIG. 1 is a block diagram illustrating an exemplary network architecture of a client-server environment 100 in accordance with some embodiments. The client-server environment 100 includes a number of client devices (e.g., personal electronic devices) 102-1, 102-2, . . . 102-n, each storing instructions for a messaging application 250 in memory 220 (FIG. 2). The client devices 102 are connected to a server system 106, storing a messaging server module 108 associated with the messaging application 250 in memory 306 (FIG. 3), by one or more networks 104 (e.g., the Internet, cellular telephone networks, mobile data networks, other wide area networks, local area networks, metropolitan area networks, etc.). In some embodiments, the one or more networks 104 include a public communication network (e.g., the Internet and/or a cellular data network), a private communications network (e.g., a private LAN or leased lines), or a combination of such communication networks.

A respective client device 102 is any suitable computing device that, in some implementations, is capable of connecting to the communication network(s) 104, receiving from the server system 106 messages, images or videos originating from other client devices 102, sending to the server system 106 messages, images or videos intended for other client devices 102, and presenting, managing, and inputting/editing messages, images or videos. In some implementations, the client device 102 is a smart phone, a mobile phone, a tablet device, a computing device of a vehicle of a user (e.g., an in-vehicle communications system, an in-vehicle entertainment system, an in-vehicle navigation system), a wearable apparatus of the user that includes a computing device (e.g., a watch of the user having a computing device, glasses of the user having a computing device, a wearable music player), a desktop computer, a laptop computer, a netbook computer, a gaming device, a multimedia player device, or any other device that is capable of sending and receiving messages, as well as presenting (e.g., displaying), managing, and inputting/editing messages. In some implementations, the client device 102 includes an image capture device (e.g., a camera).

Messages, images or videos sent by a client device 102 are sent to the server system 106, which sends the messages, images or videos to respective destination client devices 102. In some implementations, the server system 106 includes a messaging server module 108. The messaging server module 108 operates a messaging service in which client devices 102 can send and receive messages, images or videos to/from each other. The messaging server module 108 facilitates connections between client devices 102 for (i) sending and receiving messages, images or videos among client devices 102 and (ii) maintaining user accounts and data with respect to the messaging service. In some embodiments, the messaging server module 108 also stores, in the server system 106, copies of the messages, images or videos exchanged by the client devices 102. In some implementations, the servers system 106 operates a social network service, of which the messaging service and the messaging server module 108 are parts.

In some embodiments, the server system 106 is a single computing device such as a computer server, while in other embodiments, the server system 106 is implemented by multiple computing devices working together to perform the actions of a server system (e.g., cloud computing).

Users employ the client devices 102 to access the messaging server module 108 at the server system 106 and to share videos, images, and messages with each other. For example, a user of one of the client devices 102-1 executes messaging application 250 to send a video, image, and/or message to a user of one or more of the other client devices 102-2 . . . 102-n via messaging server module 108 at server system 106. An intended recipient of the video, image, and/or message executes messaging application 250 to receive the video, image, and/or message from the server module 108 at server system 106 on the client device 102 they are using.

Users of two or more client devices 102 can participate in a running discussion (e.g., a session) related to videos and images shared via messaging server module 108. Users may participate in more than one running discussion with different groups of users at any one time. The users of any one group do not have to be in active communication with messaging server module 108 when one user shares a video, image, and/or message with the group, but may retrieve the video, image, and/or message at a later time by logging-into the messaging server module 108.

Referring to FIG. 2, an exemplary client device 102 typically includes one or more processing units (CPU's) 214, one or more network or other communications interfaces 212, memory 220 (e.g., random access memory and/or non-volatile memory) optionally accessed by one or more controllers 208, and one or more communication busses 210 for interconnecting the aforementioned components.

The client device 102 also includes a user interface 200. The user interface 200 typically includes a display device 202, which is optionally integrated within the device (e.g., housed in the same chassis as the CPU and memory, such as with a smart phone or an all-in-one desktop computer). In some embodiments, the client device 102 includes input device(s) 204, such as a keyboard, mouse, and/or other input buttons. Alternatively or in addition, in some embodiments, the display device 200 includes a touch-sensitive surface, e.g., where display 202 is a touch-sensitive display or client device 102 includes a touch pad. In some embodiments, the client device 104 also includes an image/video capture device 211, such as a camera or webcam.

In client devices in which display 202 is touch-sensitive, the touch-sensitive display provides an input interface and an output interface between the device and a user. The touch-sensitive display includes a touch-sensitive surface, sensor, or set of sensors that accepts input from the user based on haptic and/or tactile contact. The touch-sensitive display detects contact (and any movement or breaking of the contact) on touch-sensitive display and converts the detected contact into interaction with user-interface objects (e.g., one or more soft keys, icons, messages, message interfaces, videos, or images) that are displayed on touch-sensitive display system (e.g., that are displayed at a location on the display 202 corresponding to the location at which the contact was detected). In client devices that have a touch-sensitive display, a physical keyboard is optional (e.g., a soft keyboard may be displayed when keyboard entry is needed). In some embodiments, the touch-sensitive display detects contact by the finger of the user and/or a stylus. In such embodiments, the display controller 203 receives and/or sends electrical signals from/to touch-sensitive display. As such, the touch-sensitive display displays visual output to the user. The visual output optionally includes graphics, text, icons, video, and any combination thereof (collectively termed "graphics").

In some embodiments, client device 102 includes a touchpad (not shown) for activating or deactivating particular functions. In some embodiments, the touchpad is a touch-sensitive area of the device that, unlike a touch screen, does not display visual output. The touchpad is, optionally, a touch-sensitive surface that is separate from a touch-sensitive display system or an extension of the touch-sensitive surface formed by the touch screen.

In some embodiments, the user interface 200 also includes an audio output device, such as speakers or an audio output for connecting with speakers, earphones, or headphones. In some embodiments, the user interface 200 also includes an audio input device (e.g., a microphone), and optional voice recognition capabilities (e.g., to supplement or replace the keyboard). Optionally, the client device 104 includes an audio input device 210 (e.g., a microphone) to capture audio (e.g., speech from a user).

In some implementations, the client device 102 also includes one or more of: one or more sensors (e.g., accelerometer, magnetometer, proximity sensor, gyroscope) (not shown), an image capture device (e.g., a camera device or module and related components) (not shown), and/or a location module (e.g., a Global Positioning System (GPS) receiver or other navigation or geolocation device and related components).

Memory 220 includes high-speed random access memory, such as DRAM, SRAM, DDR RAM, or other random access solid state memory devices, and optionally also includes non-volatile memory, such as one or more magnetic disk storage devices, optical disk storage devices, flash memory devices, or other non-volatile solid state storage devices. Memory 220 may optionally include one or more storage devices remotely located from the CPU(s) 214. Memory 220, or alternatively the non-volatile memory device(s) within memory 220, comprises a non-transitory computer readable storage medium. Access to memory 220 by other components of client device 102, such as CPU(s) 214 and the peripherals interface 206, is, optionally, controlled by controller 208. In some embodiments, memory 220 can include mass storage that is remotely located with respect to the central processing unit(s) 214. In other words, some data stored in memory 220 may in fact be hosted on devices that are external to client device 102, but that can be electronically accessed by client device 102 over an Internet, intranet, or other form of network 104 or electronic cable using communication interface 212.

The memory 220 of client device 102 stores:
- an operating system 230 that includes procedures for handling various basic system services;
- a file system 232 for controlling access to the various files and data structures described herein;
- a network communication module 234 that is used for connecting the client device 102 to other computers via the one or more communication network interface(s) 212 (wired or wireless) and one or more communication networks 104, such as the Internet, cellular telephone networks, mobile data networks, other wide area networks, local area networks, metropolitan area networks, etc.;
- a messaging application 250 for creating, processing, and sharing videos, images, and messages with other client devices via communication with messaging server module 108 through communication network interface(s) 212, and related features such as:
  - a session initiation module 251 for establishing a session of the messaging application, including naming the session, selecting a plurality of users for the session, selecting a first digital image or video for the session, and sending instructions (e.g., via communication with messaging server module 108 through communication network interface(s) 212) to create the first session on respective client devices of the selected users of the session;
  - a session selection module 252 for navigating between established messaging sessions on client device 102;
  - a session display module 253 for configuring display of digital images, videos, and messages within a session on display 202, including at least a first display modality 254 in which a limited number of messages are overlaid on a selected digital image or video, and a second display modality 255 in which a greater number of messages are overlaid on a selected digital image or video;
  - a messaging input module 256 for inputting messages into an active session of the messaging application;
  - an image and video capture module 257 for capturing and inputting images and videos (e.g., acquired using optional image/video capture device 210 or imported from user data 270 in memory 220) into an active session of the messaging application; and
  - a server communication module 258 for communicating with messaging server module 108 at server system 106 via communication network interface(s) 212, e.g., to upload and download session information, videos, images, and messages;
- optionally, a digital camera module 260 for capturing digital images and videos via the optional image/video capture device 211, processing respective digital images and videos captured by the image/video capture device, and directing storage of respective digital images 273 and digital videos 275 at a digital image store 272 and digital video store 274 in memory 220; and
- user data 270, including:
  - a digital image store 272 for storing digital images 273-1 . . . 273-M (e.g., captured using image/video capture device 211);
  - a digital video store 274 for storing digital videos 275-1 . . . 275-N (e.g., captured using image/video capture device 211); and
  - a contact list 276 for storing contact information 277 of users of other client devices 102.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 220 optionally stores a subset of the modules and data structures identified above. Furthermore, memory 220 optionally stores additional modules and data structures not described above.

It should be appreciated that device 102 is only one example of a client device, and that device 102 optionally has more or fewer components than shown, optionally combines two or more components, or optionally has a different configuration or arrangement of the components. The various components shown in FIG. 2 are implemented in hardware, software, firmware, or a combination thereof, including one or more signal processing and/or application specific integrated circuits.

Figure 3:
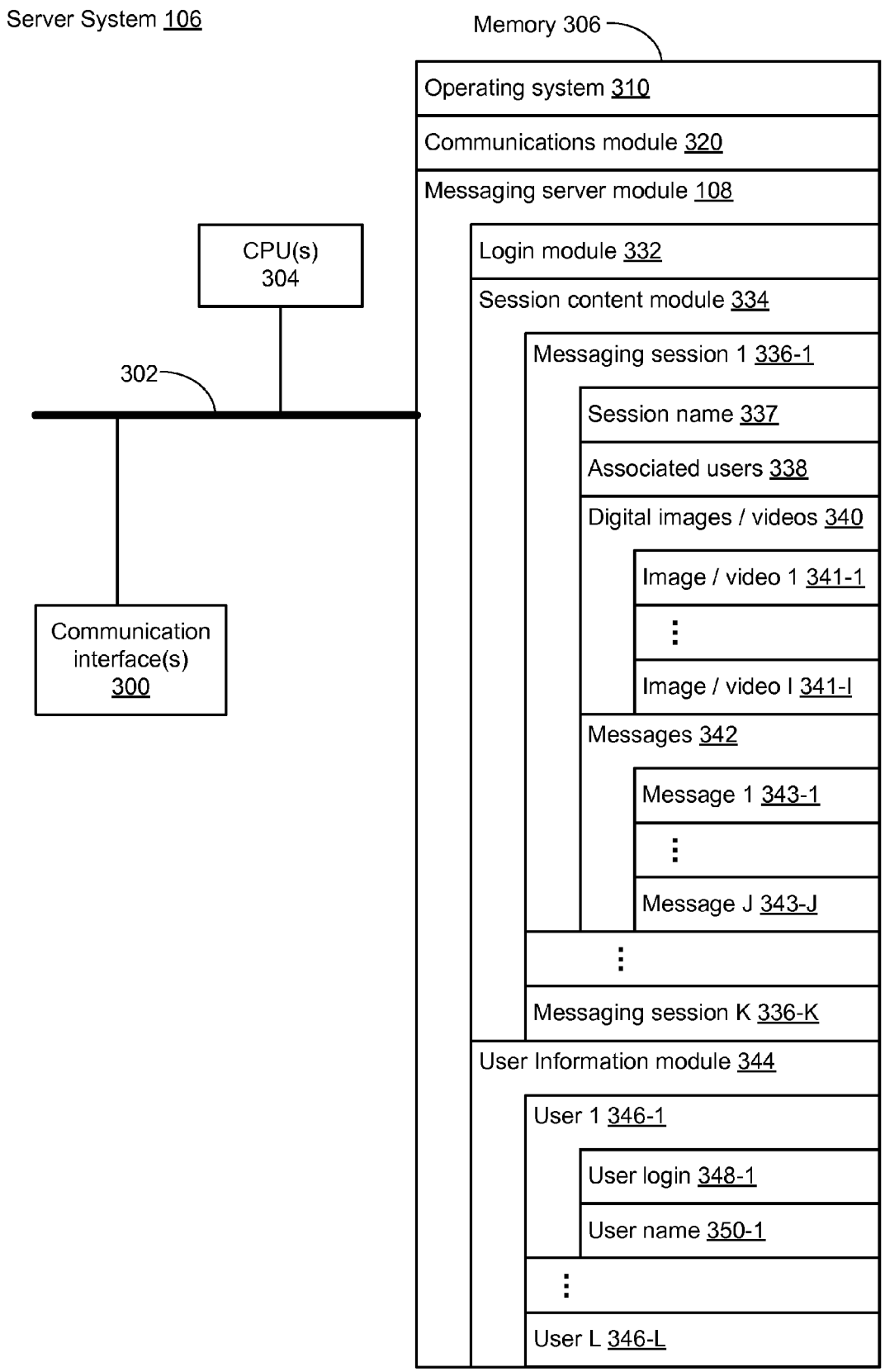
FIG. 3 is a block diagram illustrating a server system in accordance with some embodiments.
Figure 4C:
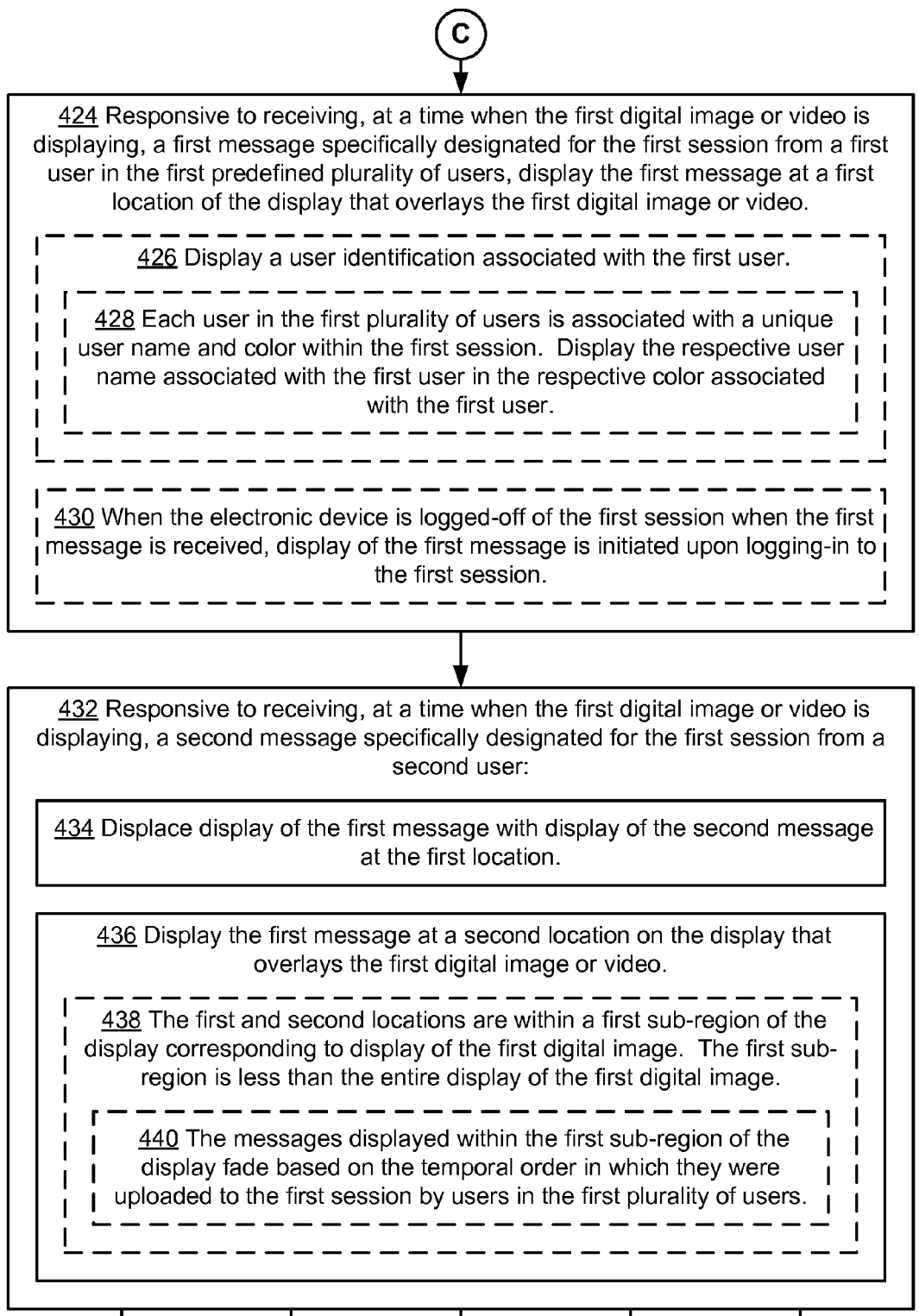
Figure 4D:
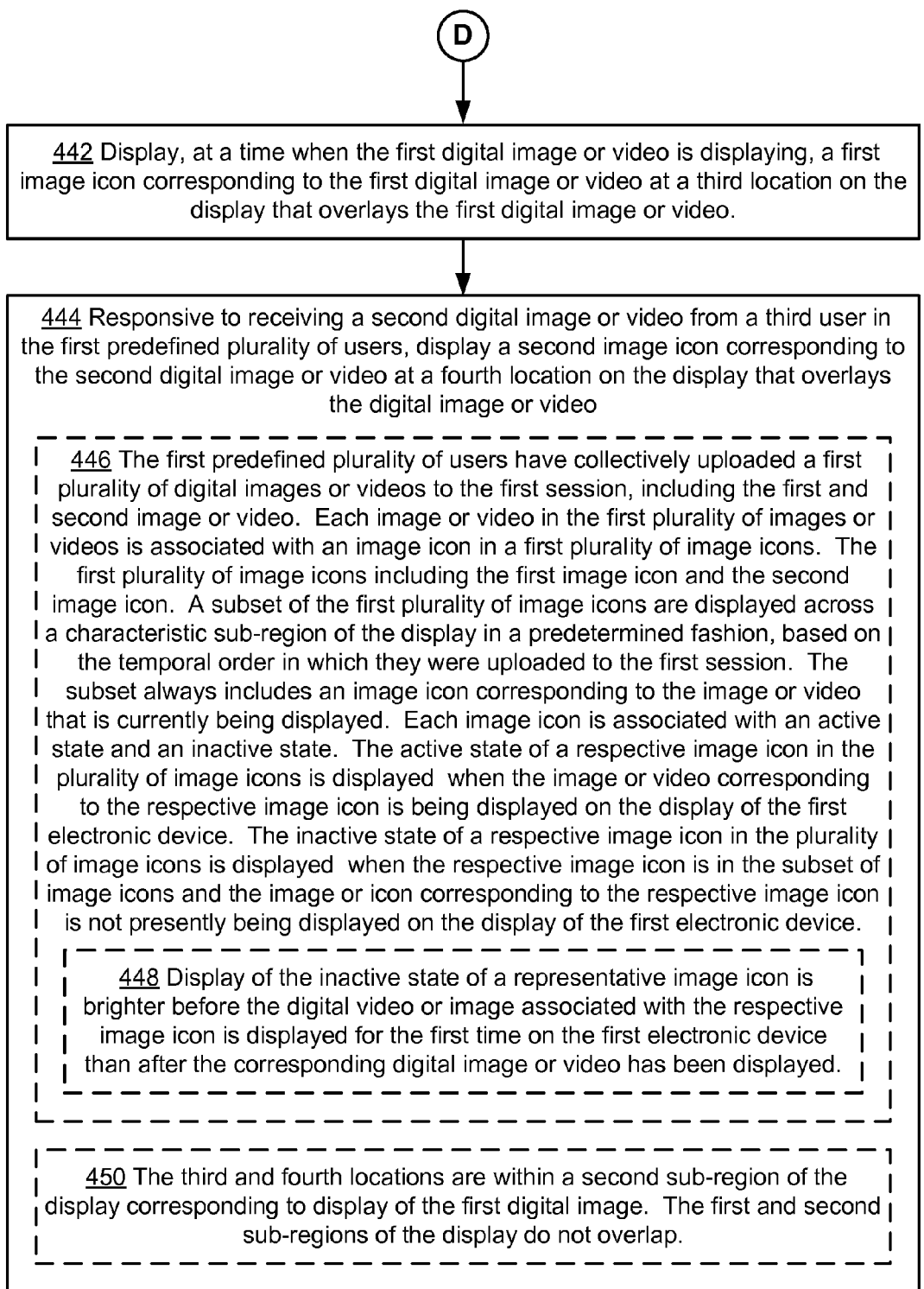
Figure 4E:
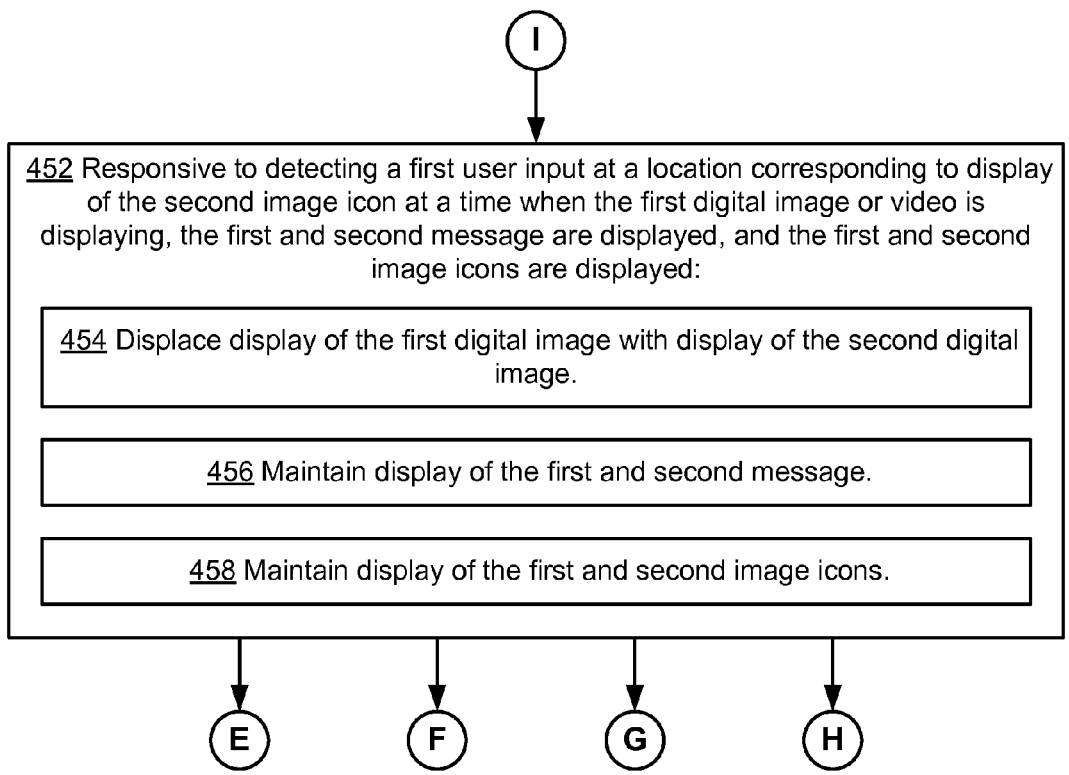
Figure 4F:
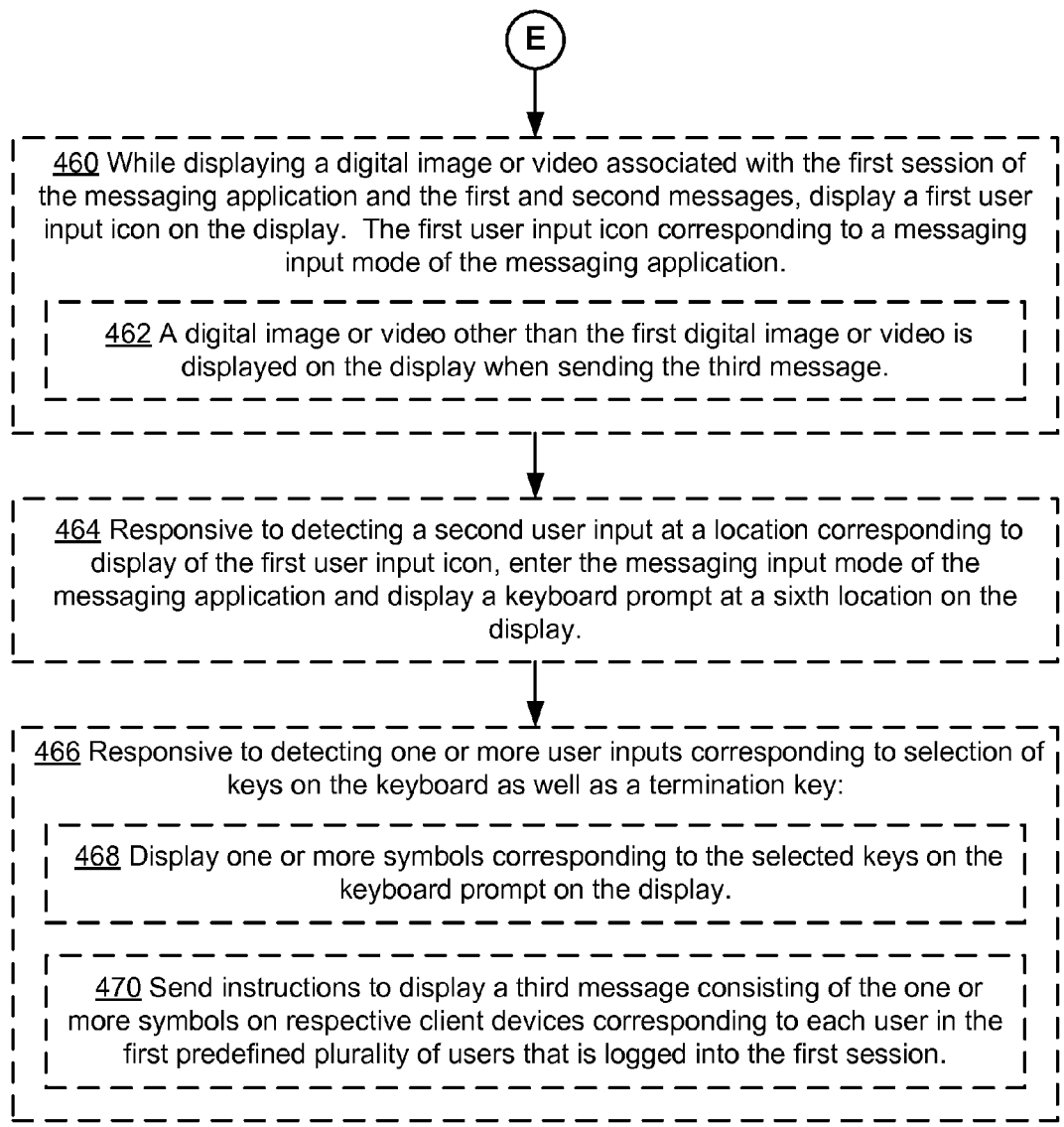
Figure 4G:
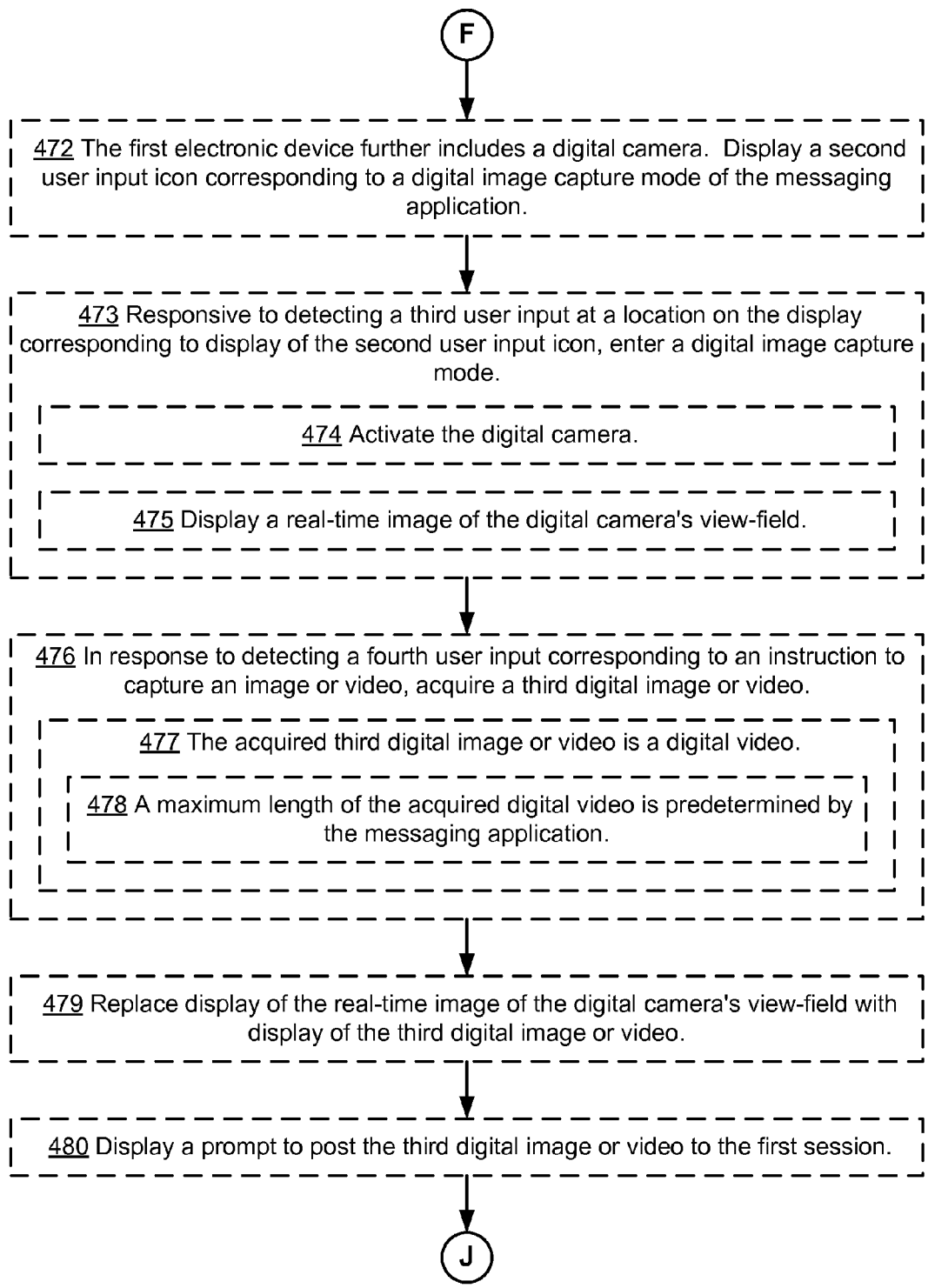
Figure 4H:
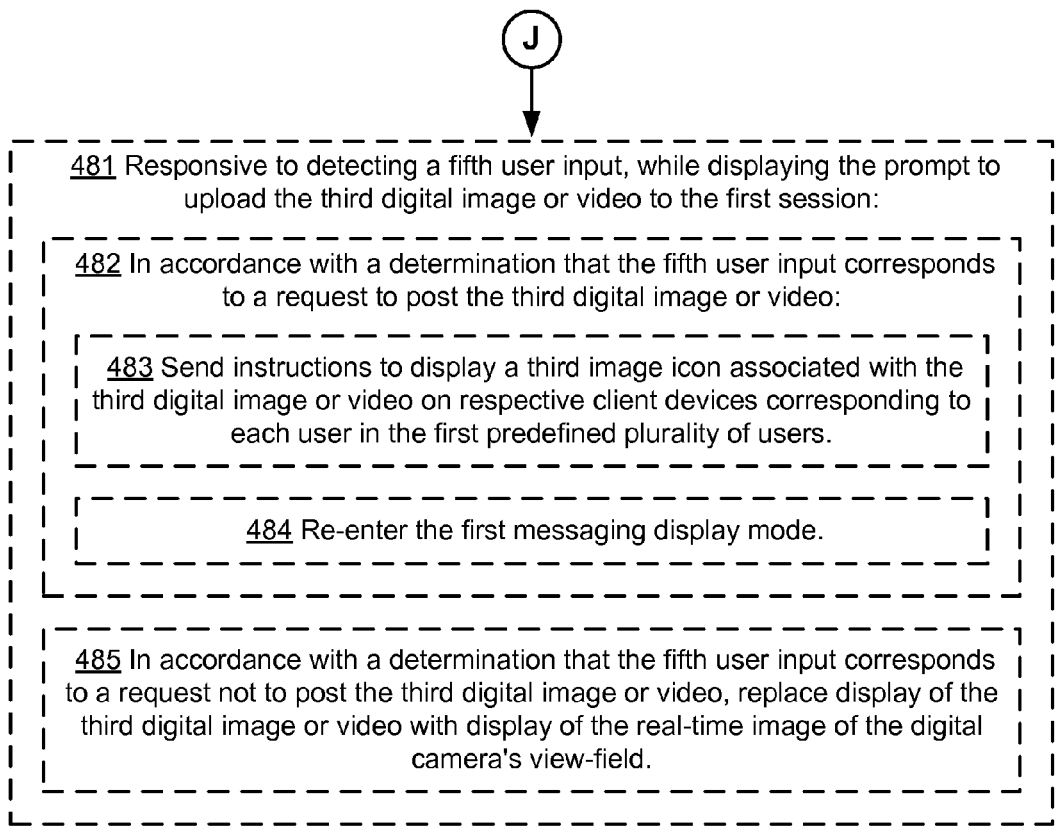
Figure 4J:
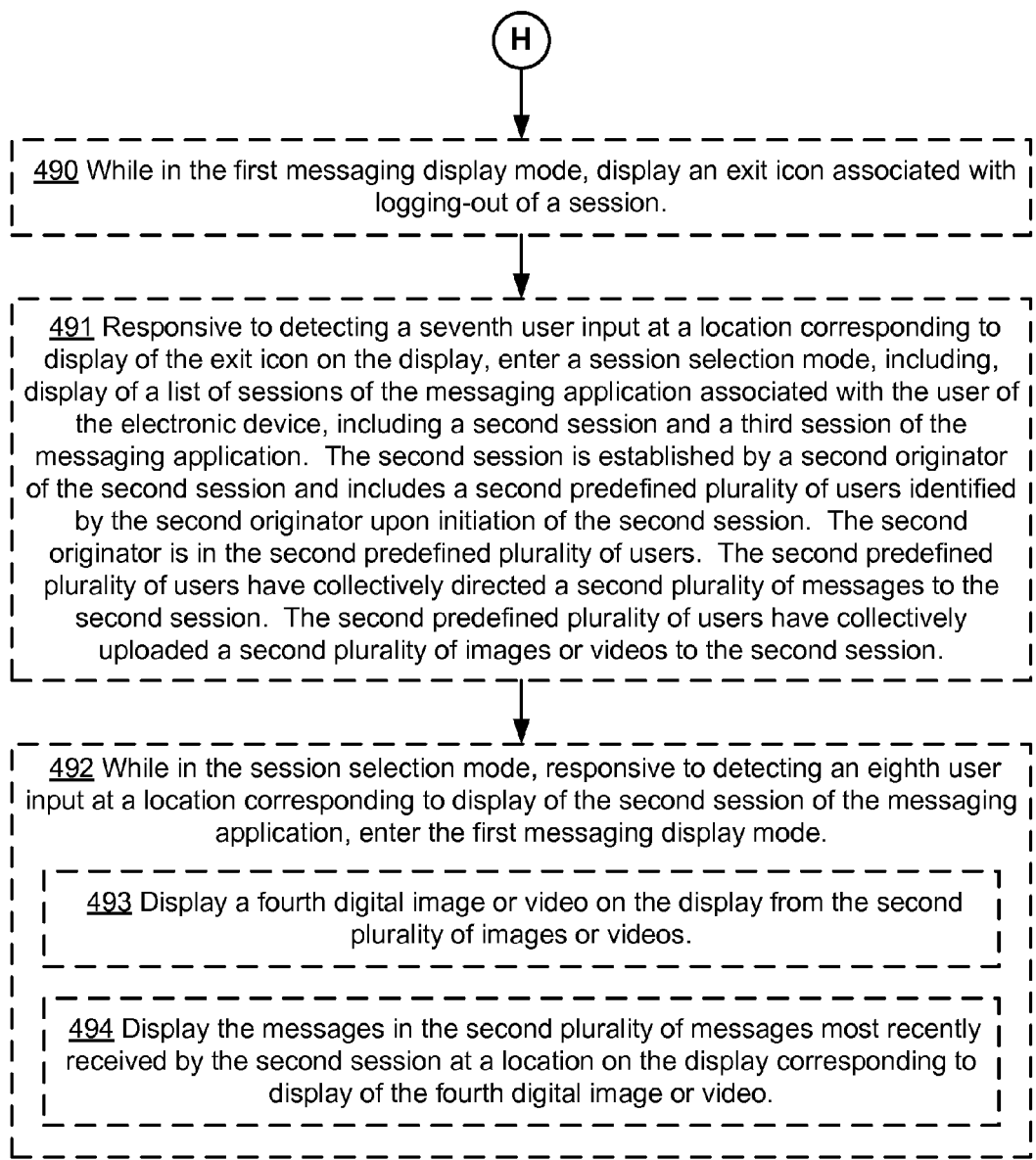
Figure 4K:
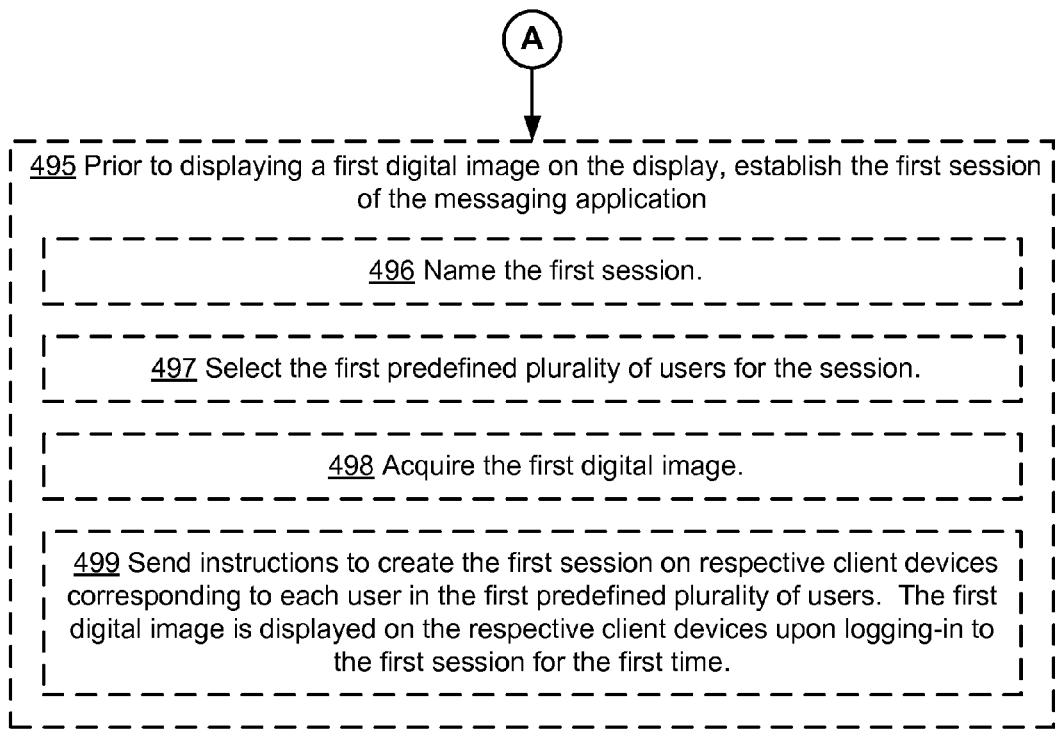

FIG. 3 is a block diagram illustrating an exemplary server system 106 in accordance with some embodiments. The server system typically includes one or more processing units (CPU's) 304, one or more network or other communications interfaces 300, memory 306 (e.g., random access memory and/or non-volatile memory), and one or more communication busses 302 for interconnecting the aforementioned components.

Memory 306 includes high-speed random access memory, such as DRAM, SRAM, DDR RAM, or other random access solid state memory devices, and optionally also includes non-volatile memory, such as one or more magnetic disk storage devices, optical disk storage devices, flash memory devices, or other non-volatile solid state storage devices. Memory 306 may optionally include one or more storage devices remotely located from the CPU(s) 214. Memory 306, or alternatively the non-volatile memory device(s) within memory 306, comprises a non-transitory computer readable storage medium. In some embodiments, memory 306 can include mass storage that is remotely located with respect to the central processing unit(s) 304. In other words, some data stored in memory 306 may in fact be hosted on devices that are external to server system 106, but that can be electronically accessed by server system 106 over an Internet, intranet, or other form of network or electronic cable using communication interface(s) 300.

The memory 306 of server system 106 stores:
an operating system 310 that includes procedures for handling various basic system services;
a network communications module 320 for connecting to client devices 102 and other server systems via the communication network interface(s) 300 (wired or wireless) and one or more communication networks (e.g., the one or more networks 104);
a messaging server module 108, associated with messaging applications 250 stored in respective memory 220 of client devices 202, with instructions for executing protocols and storing data associated with messaging application 250, such as:
  a login module 332 for authenticating users of messaging application 250, and for providing authenticated users access to data associated with respective messaging sessions;
  a session content module 334 for storing data associated with respective messaging sessions 336-1 . . . 336-K, including:
    session names 337, lists of respective users 338 associated with each messaging session 338, digital image/video stores 340 for storing respective images and videos 341 uploaded for each messaging session 336, message stores 342 for storing respective messages 343 uploaded for each messaging session 336; and
  a user information module 344 for storing information associated with respective users 346-1 . . . 346-L of messaging application 250, including:
    user login information 348 (e.g., names and passwords for logging into the server system 106) and user names 350 (e.g., names displayed in conjunction with messages uploaded to a respective messaging session).

In some embodiments, information for users 346 stored in the user information module includes user profiles, login information, privacy and other preferences, and/or biographical data. In some embodiments, a login name associated with a respective user is the same as the user name displayed for the user. In other embodiments, a login name associated with a respective user is different than the user name displayed for the user.

Now that devices and servers in accordance with the present disclosure have been described, methods for using these devices and servers will be described. In this regard, FIGS. 4A-4K illustrate a flow diagram of a method 400 of blending images and videos with messages in a texting environment in accordance with some embodiments.

The method 400 is performed at an electronic device (e.g., client device 102 in FIGS. 1-2 and 5A-5L) with a display and input device(s) (e.g., a touch-sensitive surface). In some embodiments, the display is a touch-screen display with a touch-sensitive surface on or integrated with the display. Some operations in method 400 are, optionally, combined and/or the order of some operations is, optionally, changed.

As described below, the method 400 provides an intuitive way to blend videos and images with messages in a texting environment. The method reduces the cognitive burden on a user when sharing videos, images, and messages, thereby creating a more efficient human-machine interface. For battery-operated electronic devices, enabling a user to share videos, images, and messages faster and more efficiently conserves power and increases the time between battery charges.

The device displays (402) a first digital image or video on a display (e.g., digital image 341-3 on display 202 in FIG. 5A), while a messaging application (e.g., messaging application 250 in FIGS. 1-2) is in a first messaging display mode (e.g., first display modality 254 in FIG. 2). The first digital image or video is associated with a first session of the messaging application (e.g., messaging session 336-1 stored in memory 306 of server system 106 in FIG. 3). The first session is established by a first originator of the first session and includes a first predefined plurality of users (e.g., associated users 338 in FIG. 3) identified by the first originator upon initiation of the first session. The first originator is in the first predefined plurality of users.

In some embodiments, the first digital image or video is a digital image that is statically displayed on the device when selected. In some embodiments, the first digital image or video is a digital video (404). In some embodiments, the digital video is played on the device when selected. In some embodiments, the device plays (406) the digital video on a recurring basis (e.g., a continuous loop) on the display without human intervention. For example, the video is continuously playing in the background while users of the session post messages over the video. In other embodiments, the digital video is played once when selected, or played upon request be the user of the device (e.g., the user initiates playing of the video by tapping on the display (e.g., a particular location on the display associated with an instruction to play the video). In some embodiments, where the video is not played on a loop, an image from the video (e.g., the first, last, or an intermediate frame of the video) is displayed on the device while the video is selected.

In some embodiments, the messaging application 250 is configured to only display short videos (e.g., 1, 2, 3, 4, 5, 6, 7, 8, 9, 10, or more seconds), promoting a fast and exciting user experience. In this fashion, users can quickly record and post videos to a messaging session. Likewise, the user can receive quick feedback from the other users of the group, who do not have to spend a long time watching the video. This allows the messaging application to be used quickly, when the user does not have much free time (e.g., between class periods, while walking to lunch, or during a short break at work). This also promotes users to frequently check into a session and share a quick video, keeping a conversation fresh and lively, even throughout a busy day.

In some embodiments, the length of a digital video 341 uploaded to a messaging session 336 (e.g., a video displayed within a messaging session) must satisfy a predetermined length requirement. In some embodiments, the length of the video must be no longer than a predetermined length (e.g., no longer than 1, 2, 3, 4, 5, 6, 7, 8, 9, 10, or more seconds in length). In some embodiments, the video must be of a predetermined length of time (e.g., exactly 1, 2, 3, 4, 5, 6, 7, 8, 9, 10, or more seconds). In some embodiments, the length requirement is a requirement that the length of the video is between a predetermined minimum length (e.g., 1, 2, 3, 4, 5, or more seconds) and a predetermined maximum length (e.g., 3, 4, 5, 6, 7, 8, 9, 10, or more seconds).

In some embodiments, a length requirement for a video uploaded to a messaging session is predetermined by the messaging application (e.g., it is a hard setting that cannot be changed by the user). In other embodiments, a length requirement for a video uploaded to a messaging session is predetermined by the originator of the session (e.g., the originator is prompted to select, or may change a default value for, the length requirement when establishing the session).

In some embodiments, when the user records a digital video within the messaging application (e.g., in a image and video capture mode), the messaging application fixes the length of the recording time (e.g., the messaging application instructs an image capture device 211 to record a video having a length matching the length requirement of the video). In some embodiments, when the user uploads a previously recorded video that exceeds the length requirement (e.g., a digital video 275 stored within the user data 270 of client device 102 in FIG. 2, which was recorded prior to initiating the messaging application) to the messaging session, the messaging application 250, or messaging server module 108, truncates the video to conform with the video length requirement. In some embodiments, when a user attempts to upload a previously recorded video that exceeds the length requirement, the messaging application denies the request to upload the video and, optionally, displays a message that the video exceeds the length requirement.

In some embodiments, the first predefined plurality of users have collectively uploaded (408) a first plurality of digital images or videos to the first session, including a first and second digital image or video. For example, messaging session 336-1, stored in memory 306 at server system 106 in FIG. 3, and displayed on display 202 of client device 102 in FIGS. 5A-5H, includes at least six digital images or videos 341-1, 341-2, 341-3, 341-4, 341-5, and 341-6 (e.g., as indicated by image icons 504-1, 504-2, 504-3, 504-4, 504-5, and 504-6 in FIGS. 5A-5H).

In some embodiments, where the users have collectively uploaded multiple digital images or videos to the messaging session, the device sequentially displays (410) the first plurality of digital images or videos based on the temporal order in which they were uploaded to the first session (e.g., the device displays the plurality of images or videos sequentially on a recurring basis). For example, client device 102 is actively displaying digital image or video 341-3 on display 202 in FIG. 5A. When the client device finishes displaying digital image or video 341-3, it will next display digital image or video 341-4, and then digital image or video 341-5, etc. In some embodiments, the sequential display of digital images or videos occurs without human intervention (e.g., the device automatically switches display to the next digital image or video once display of the previous image or video is complete).

While the length of time a digital video is displayed may be determined by the length of the video (e.g., it is displayed for a time period sufficient to view the entire video once, twice, etc.), there is no period of time inherently associated with a digital image. Thus, in some embodiments including sequential display of the plurality of digital images or videos, a respective digital image is displayed for a predetermined length of time before the display is switched to the next digital image or video. In some embodiments, the digital image is displayed for a length of time satisfying a digital video length requirement (e.g., where digital videos must be no more than five seconds long, a digital image may be displayed for no more than five seconds, or a multiple thereof).

In some embodiments, users of a messaging session 336 can view the digital images and videos uploaded onto the session independently from each other. Accordingly, in some embodiments, where the users have collectively uploaded a plurality of digital images or videos to the messaging session, while logged into a first instance of the first session, the device displays (412) a respective digital image or video (e.g., digital image or video 341-3) in the first plurality of digital images or videos in an asynchronous manner. The identity of the respective digital image or video being displayed at a given time is independent of the identity of a respective digital image or video in the first plurality of images or videos being displayed contemporaneously at a second instance of the first session that is associated with a second user in the first predefined plurality of users. For example, when client devices 102-1 and 102-2 (e.g., as shown in FIG. 1) are both logged into the first messaging session 336-1, the first and second users can view any of digital images or videos 341-1 though 341-6 (e.g., as indicated by image icons 504-1 through 504-6 on display 202 in FIGS. 5A-5H) independently of the other user. That is, client device 102-1 may be displaying digital image or video 341-3 while client device 102-2 is displaying digital image or video 341-6.

In some embodiments, the first session (e.g., any messaging session 336) persists (414) for each respective user in the first predetermined plurality of users (e.g., for the user of first client device 102-1) across periods of time when respective users are logged out of the first messaging application. For example, when a user logs out a messaging session, other users may continue to post digital images, videos, and/or messages to the session. When the user logs back into the session, the display associated with the session will be updated to reflect the newly posted digital images, videos, and/or messages. E.g., a first user logs out of the session displayed in FIG. 5B, when only message 343-1 has been posted. While the user is logged out of the session, two other users post messages 343-2 and 343-3 to the first session, respectively. When the first user logs back onto the session, the display of the session has been updated (e.g., as shown in FIG. 5D) to reflect posting of the two new messages.

In some embodiments, the first predefined plurality of users have collectively directed (416) a first plurality of messages to the first session, including the first and second messages. For example, first messaging session 336-1, stored in memory 306 at server system 106 in FIG. 3, includes at least three messages (343-1, 343-2, and 343-3) when displayed on display 202 of client device 102 in FIG. 5D.

In some embodiments, while users view uploaded digital images and videos asynchronously on respective devices, users view recently directed messages concurrently, e.g., when navigating within the first message display modality 254. Accordingly, in some embodiments, where the users have collectively directed a plurality of messages to the first session, while the first device is logged into a first instance of the first session (e.g., client device 102-1 is logged into session 336-1 in FIG. 5D), the device displays (418) at least the last M messages (e.g., the last three messages 343-1, 343-2, and 343-3 of the at least 99 messages directed to the first session, as displayed in FIG. 5D) in the first plurality of messages that had been directed to the first session by the first plurality of predefined users without human intervention in a synchronous manner (e.g., new messages are automatically displayed within the first display modality 254 of client devices that are logged into the session when the messages are directed to the session). The identity of the M messages in the first plurality of messages being displayed at a given time in the first instance of the first session is the same as the identity of the M messages in the first plurality of messages displayed at contemporaneously at the second instance of the first session (e.g., all client devices 102 logged into the session are displaying the same set of messages at the same time, when in the first display modality 254).

Figure 5A:
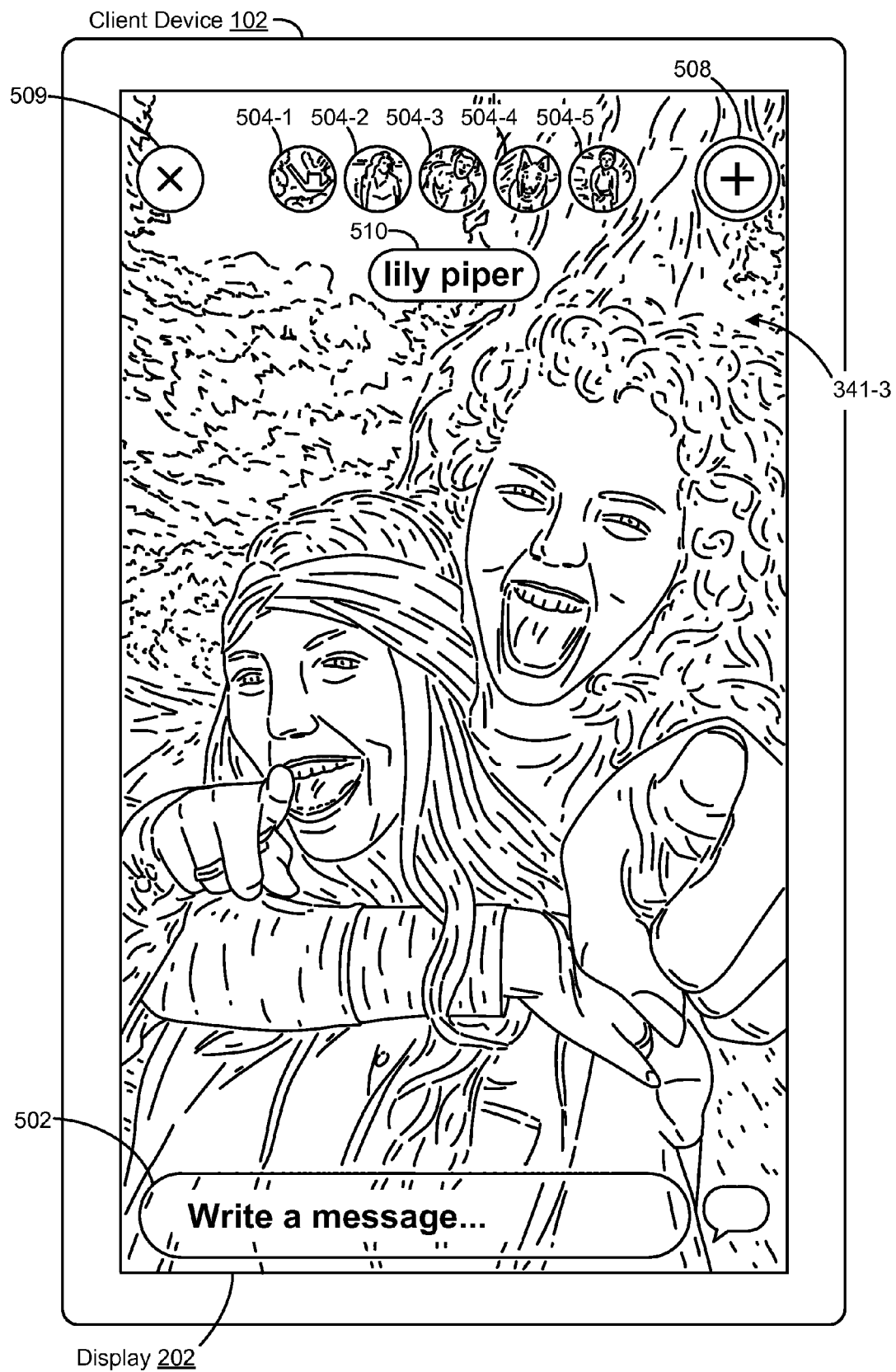
FIGS. 5A, 5B, 5C, 5D, 5E, 5F, 5G, 5H, 5I, 5J, 5K, and 5L illustrate exemplary user interfaces for blending videos and images with messages in a texting environment in accordance with some embodiments.
Figure 5B:
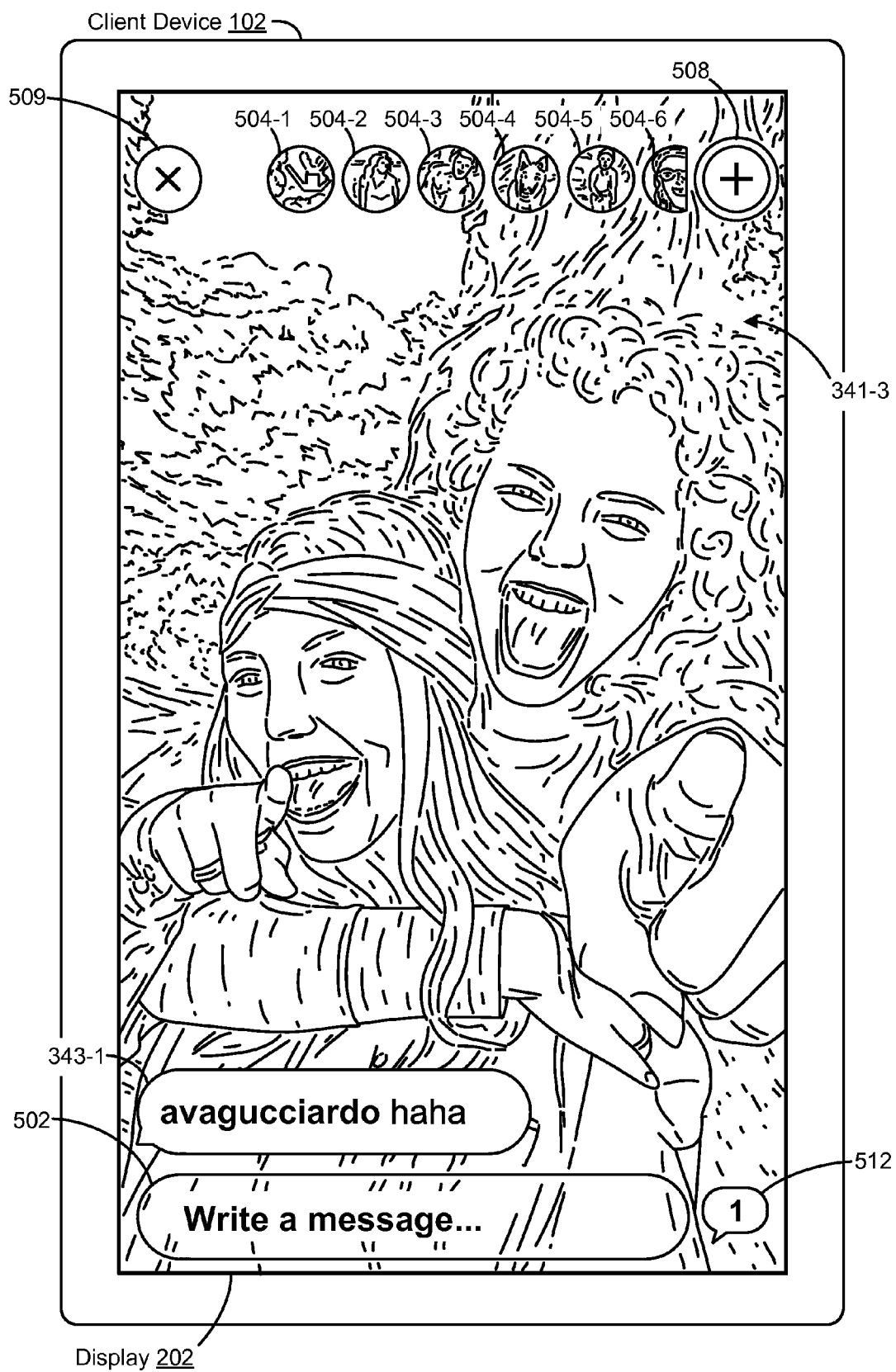
Figure 5C:
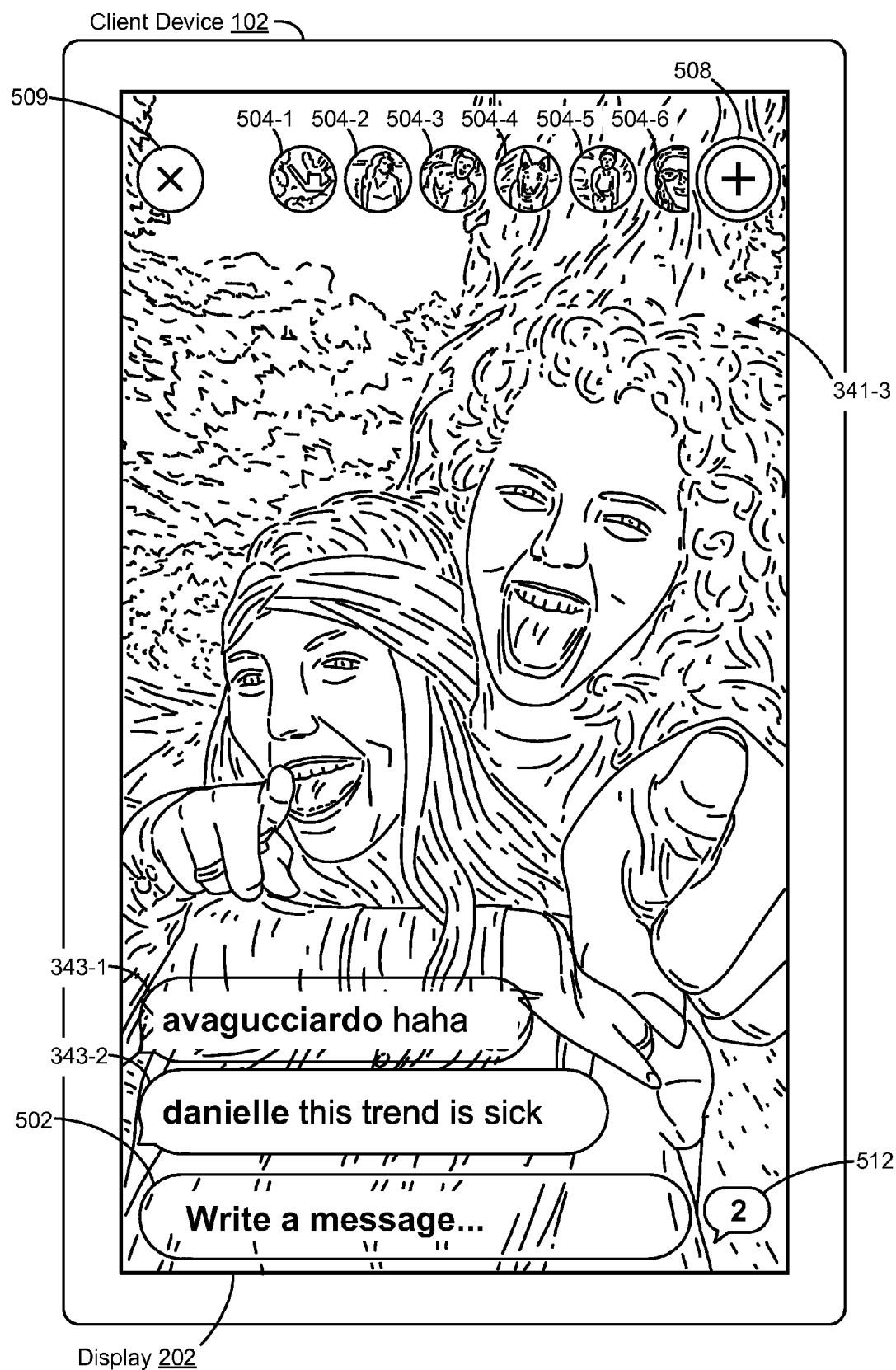
Figure 5D:

For example, when client devices 102-1 and 102-2 are both logged into first messaging session 336-1, and are navigating in first display modality 254, both client devices display messages 343-1, 343-2, and 343-3 (e.g., as illustrated in FIG. 5D), regardless of the digital image or video being displayed on the respective client device (e.g., client device 102-1 may be displaying digital image or video 341-3 and client device 102-2 may be displaying digital image or video 341-6).

Figure 5E:
Figure 5F:
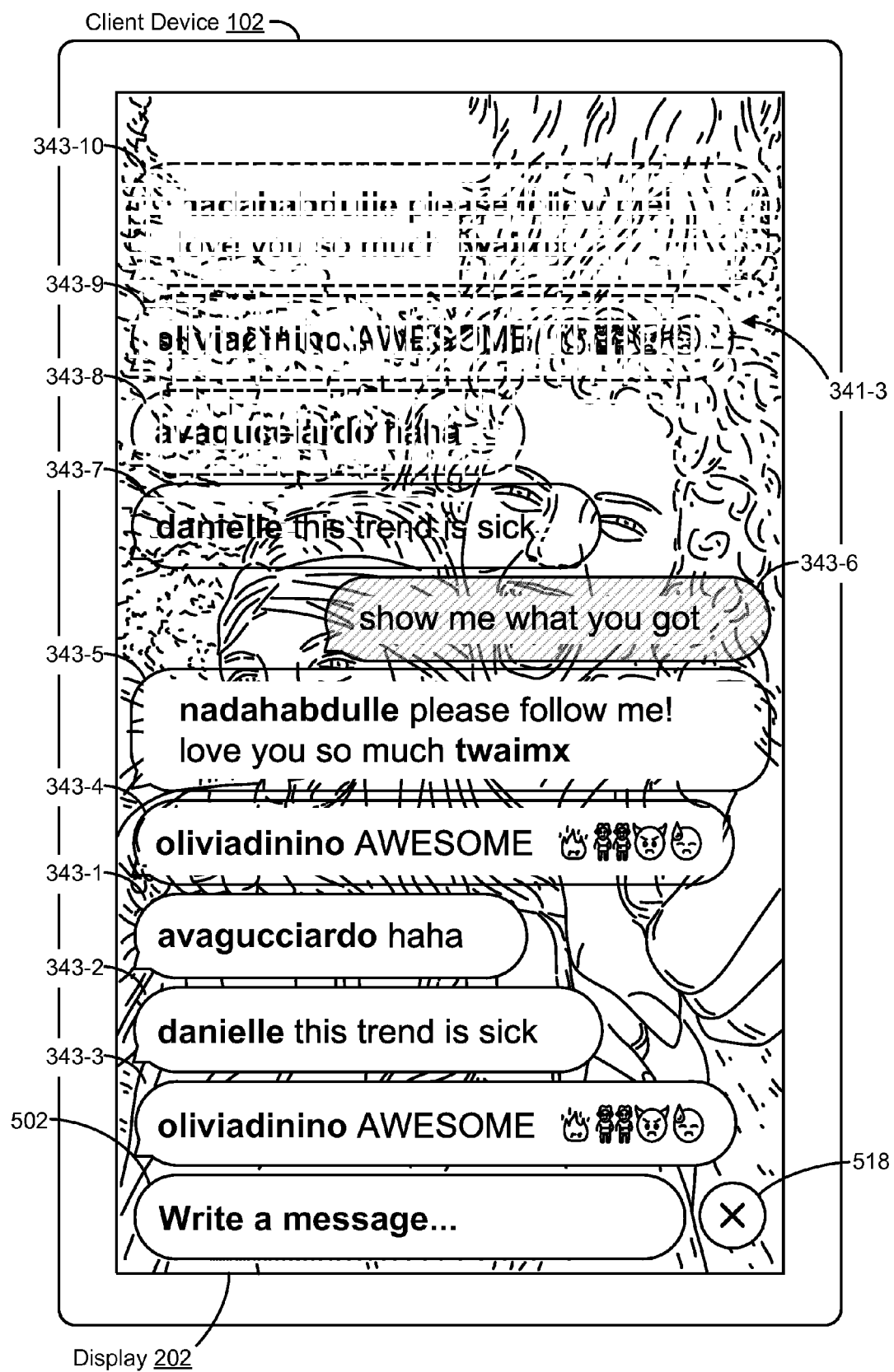
Figure 5G:
Figure 5H:

In some embodiments, the value of M (e.g., the number of messages displayed at a given point in time) is dependent (420) on a display mode of the messaging application. For example, when an instance of the messaging application is in a first display mode 254, the device may display the last three messages (or the last 1, 2, 3, 4, 5, 6, 7, 8, or more messages) directed to the messaging session (e.g., as illustrated in FIG. 5D). However, when the same instance of the messaging application is in a second display mode 255, the device may display the last 11 messages (or the last 3, 4, 5, 6, 7, 8, 9, 10, 11, 12, 13, or more messages) directed to the messaging session (e.g., as illustrated in FIG. 5E). In some embodiments, when an instance of the messaging application is in a first display mode 254, the device displays the last three messages directed to the messaging session (e.g., as illustrated in FIG. 5D), and when the same instance of the messaging application is in a second display mode 255, the device displays the last N number of messages such that the displayed messages substantially cover the entirety of the display (e.g., as illustrated in FIG. 5F). In some embodiments, the messages displayed when the device is in the second display modality 255 fade based on the temporal order in which they were uploaded to the first session. E.g., the messages displayed on client device 102 in FIG. 5F fade towards the top of the screen, such that more of digital image or video 341-3 is visible through the messages at the top of the screen (e.g., the older messages) than at the bottom of the screen (e.g., the newer messages).

In some embodiments, fading refers to a decrease in the opacity of the displayed message. For example, in some embodiments, the most recently directed message (or messages) is completely opaque to the underlying digital image or video (e.g., none of digital image or video 341-3 is discernible under message 343-3 in FIG. 5F), while older messages are almost completely transparent (e.g., image 341-3 is readily discernible under message 343-10 in FIG. 5F).

In some embodiments, first predefined plurality of users cannot be changed after the originator establishes the first session (422). E.g., the members of the session are fixed once the session is initiated, and users can neither be added nor removed from the session. In some embodiments, new users cannot be added to the session once initiated, but users may be removed from a session after initiation. In this fashion, users who are abusing or otherwise disruptive to the group may be removed from the session. This way, the session can be continued when it would otherwise be abandoned by the other users of the session or closed/removed entirely. In some embodiments, only the originator has the ability to remove users from a session (e.g., acting in the capacity of a moderator).

The messaging application displays messages over the selected digital image or video. In this fashion, users can quickly and efficiently view the shared digital images or videos, and messages (e.g., simultaneously). Accordingly, in some embodiments, in response to receiving, at a time when the first digital image or video is displaying (e.g., when digital image or video 341-3 is displayed on client device 102-1 in FIG. 5A), a first message specifically designated for the first session (e.g., message 343-1 in FIG. 3) from a first user in the first predefined plurality of users (e.g., a client device 102-*i* in client-server environment 100 in FIG. 1), the device displays (424) the first message at a first location of the display that overlays the first digital image or video (e.g., client device 102-1 displays message 343-1 over digital image or video 341-3 in FIG. 5B). In some embodiments, the first location is a sub-location of the display (e.g., display 202) that corresponds to active display of the digital image or video (e.g., at a designated position on the display that is smaller than the area of the digital image or video). For example, when navigating in a first display modality 254, the messaging application 250 displays directed messages over the bottom portion of the displayed digital image or video (e.g., at the bottom half, third, quarter, etc. of the display 202).

In some embodiments, displaying the message includes displaying (426) a user identification associated with the first user (e.g., the user who sent the first message). For example, client device 102-1 displays "avagucciardo" next to the message "haha" 343-1 in FIG. 5B to inform the user of client device 102-1 (e.g., the first client device, which may be associated with a user other than the first user sending the first message) of the identity of the user sending the message. In some embodiments, each user in the first plurality of users is associated with a unique user name (e.g., user name 350 associated with a respective user 346 registered with the messaging server module 108) and color within the first session. The device displays (428) the respective user name associated with the first user in the respective color associated with the first user. For example, user identification "avagucciardo," associated with message 343-1 (e.g., as illustrated in FIG. 5D), is displayed in a first color, while user identification "danielle," associated with message 343-2, is displayed in a second color.

In some embodiments, the color associated with the user is selected by the user, e.g., as a global setting stored in user information module 344, which is applied to each messaging session in which the user is a participant, or alternatively, when logging into a messaging session 336 for the first time. The later embodiment can be implemented to ensure that no two respective users of a messaging session are identified with the same color within a respective session. The former embodiment allows a respective user more creative expression (e.g., the user can change their associated color depending on their mood or simply on a whim). In some embodiments, the color associated with the user is assigned by the messaging application 250 or messaging server module 108 (e.g., upon origination of a messaging session 336).

In some embodiments, the messaging session 336 is automatically updated when the user logs back into a session (e.g., the messages displayed for a respective session are refreshed to reflect those most recently sent). Accordingly, in some embodiments, when the electronic device is logged-off of the first session (e.g., session 336-1) when the first message is received, the device initiates display (430) of the first message upon logging-in to the first session. For example, the user logs off of the messaging session illustrated in FIG. 5B (e.g., at a time when message 343-1 is the only message that has been directed to the session), and message 343-2 is directed to the session when the user is logged off. Upon logging back into the session, messages 343-1 and 343-2 are displayed within the session (e.g., as illustrated in FIG. 5C).

In some embodiments, the display of messages 343 directed to a particular session 336 (e.g., when in a first display modality 254) is continuously updated on the client device 102, such that the client device is always displaying the most recently sent messages in the conversation. Accordingly, in some embodiments, responsive to receiving, at a time when the first digital image or video is displaying (432), a second message specifically designated for the first session from a second user: the device displaces display (434) of the first message with display of the second message at the first location. For example, the display of message 343-1 at the bottom of display 202 in FIG. 5B is replaced by display of message 343-2 at the bottom of display 202 in FIG. 5C. The device also displays (436) the first message at a second location on the display that overlays the first digital image or video. E.g., message 343-1, being displaced by message 343-2, is displayed above its original position in FIG. 5C (e.g., it is pushed up by the new message). In some embodiments, displacement of the first message by the second message is animated on the display (e.g., such that the second message 343-2 appears to be pushing the first message 343-1 up on the display).

In some embodiments, the first and second locations (e.g., the locations at which first and second messages are displayed, respectively) are within a first sub-region of the display corresponding to display of the first digital image (438). The first sub-region is less than the entire display of the first digital image. For example, when in a first display modality 254, the messaging application 250 directs display of received messages over the bottom portion of the displayed digital image or video (e.g., at the bottom half, third, quarter, etc. of the display 202).

In some embodiments, the messages displayed within the first sub-region of the display fade (440) based on the temporal order in which they were uploaded to the first session by users in the first plurality of users. For example, messages 343-2 and 343-1 are faded with respect to message 343-3 in FIG. 5D, because they were directed to the session earlier than message 343-3.

The messaging application also displays selectable image icons over the digital image or video being displayed, which allow the user to navigate through the various images and videos that have been uploaded to the session. Accordingly, the device displays, at a time when the first digital image or video is displaying (e.g., digital image or video 341-3 in FIG. 5C), a first image icon (e.g., icon 504-3) corresponding to the first digital image or video at a third location on the display (e.g., at the top of display 202) that overlays the first digital image or video. In some embodiments, the third location is within a second sub-region of the display displaying the digital image or video. For example, when in a first display modality 254, the messaging application 250 directs display of image icons over the top portion of the displayed digital image or video (e.g., at the top half, third, quarter, etc. of the display 202).

When a new digital image or video is uploaded to the session, the application 250 directs display of a new icon for the new digital image or video. Accordingly, responsive to receiving a second digital image or video from a third user in the first predefined plurality of users, the device displays (444) a second image icon corresponding to the second digital image or video at a fourth location on the display that overlays the digital image or video. For example, in FIG. 5A, image icons 504-1 through 504-5 corresponding to digital images or videos 341-1 through 341-5 are displayed over the top of digital image or video 341-3. When digital image or video 341-6 is uploaded to the session, device 102 displays a corresponding image icon 504-6 next to the other image icons in FIG. 5B.

In some embodiments, the first predefined plurality of users (e.g., users of session 336-1) have collectively uploaded a first plurality of digital images or videos to the first session, including the first and second image or video (e.g., digital images or videos 341-1 through 341-10). Each image or video in the first plurality of images or videos is associated with an image icon in a first plurality of image icons (e.g., image icons 504-1 through 504-10). The first plurality of image icons including the first image icon and the second image icon. A subset of the first plurality of image icons are displayed across a characteristic sub-region of the display in a predetermined fashion, based on the temporal order in which they were uploaded to the first session (e.g., icons 504-1 through 501-6 are displayed across the top of display 202 in the order, left to right, in which they were uploaded to the session in FIG. 5D). The subset always includes an image icon corresponding to the image or video that is currently being displayed (e.g., image icon 504-3, corresponding to displayed digital image or video 341-3, is displayed).

In some embodiments, each image icon 504 is associated with an active state and an inactive state (446). The active state of a respective image icon in the plurality of image icons is displayed when the image or video corresponding to the respective image icon is being displayed on the display of the first electronic device (e.g., the active state of icon 504-3 is displayed in FIG. 5D because corresponding digital image or video 341-3 is displayed on display 202). The inactive state of a respective image icon in the plurality of image icons is displayed when the respective image icon is in the subset of image icons and the image or icon corresponding to the respective image icon is not presently being displayed on the display of the first electronic device (e.g., the inactive state of icon 504-4 is displayed in FIG. 5D because corresponding digital image or video 341-4 is not displayed on display 202). For example, in FIG. 5D, image icon 504-3 is displayed with a different property than image icons 504-1, -2, -4, -5, and -6 because it is in an active state, while the others are in inactive states.

In some embodiments, the inactive state of an image icon informs the user whether or not the corresponding digital image or video has been viewed. For example, in some embodiments, display of the inactive state of a representative image icon 504 is brighter before the digital video or image 341 associated with the respective image icon is displayed for the first time on the first electronic device, as compared to display of the image icon after the corresponding digital image or video has been displayed. For example, display of image icon 504-1 is darker than image icon 504-4 in FIG. 5D because corresponding digital image or video 341-1 has been viewed by the user, while digital image or video 341-4, corresponding to image icon 504-4, has not been viewed.

In some embodiments, the first sub-region (e.g., the portion of the display 202 displaying messages 343) and the second sub-region (e.g., the portion of the display 202 displaying image icons 504) do not overlap (e.g., messages 343 are displayed at the bottom of the display 202, while image icons 504 are displayed at the top of the screen 202 in FIG. 5D). Accordingly, in some embodiments, the third and fourth locations are within a second sub-region of the display corresponding to display of the first digital image (450). The first and second sub-regions of the display do not overlap. For example, icons 504-3 and 504-6 are displayed at the top of the screen, while messages 343-1 and 343-2 are displayed at the bottom of the screen in FIG. 5D.

When the user selects (e.g., taps on) a particular image icon 504, the messaging application 250 directs display of the digital image or video 341 associated with the image icon 504. Accordingly, responsive to detecting a first user input at a location corresponding to display of the second image icon (e.g., when the user taps on image icon 504-6 in FIG. 5C) at a time when the first digital image or video is displaying (e.g., when digital image 341-3 is displayed), the first and second message are displayed (e.g., when messages 343-1 and 343-2 are displayed), and the first and second image icons are displayed (e.g., image icons 504-3 and 504-6 are displayed) (452): the device displaces (454) display of the first digital image with display of the second digital image (e.g., the device displays image 341-6, associated with image icon 504-6, rather than digital image or video 341-3). The device maintains (456) display of the first and second message (e.g., messages 343-1 and 343-2 remain on display 202 when the application switches to display of digital image or video 341-6). The device also maintains (458) display of the first and second image icons (e.g., image icons 504-3 and 504-6 remain on display 202 when the application switches to display of digital image or video 341-6).

The application also includes a messaging input mode 256, which the user enters by selecting an icon (e.g., a text prompt) corresponding to the input mode 256. Accordingly, in some embodiments, while displaying a digital image or video associated with the first session of the messaging application (e.g., while displaying image or video 341-3 in FIG. 5D) and the first and second messages (e.g., messages 343-1 and 343-2), the device displays a first user input icon on the display (e.g., text prompt 502). The first user input icon corresponding to a messaging input mode of the messaging application (e.g., input mode 256).

Responsive to detecting a second user input at a location corresponding to display of the first user input icon (e.g., a tap on text prompt 502 in FIG. 5D), the device enters (464) the messaging input mode of the messaging application (e.g., as exemplified in FIG. 5E) and displays a keyboard prompt (e.g., keyboard prompt 516) at a sixth location on the display (e.g., at the bottom of the display). In some embodiments, the keyboard prompt displaces other elements on the display (e.g., messages 343-1 and 343-2 are pushed up in response to display of the keyboard prompt at the bottom of the screen in FIG. 5E).

When in the messaging input mode 256 of the application 250, the user can type messages to the other users of the active session 336. Accordingly, in some embodiments, responsive to detecting one or more user inputs (466) corresponding to selection of keys on the keyboard (e.g., letter, numbers, and emojis on keyboard 516) as well as a termination key (e.g., the "return" key on keyboard 516): the device displays (468) one or more symbols corresponding to the selected keys on the keyboard prompt on the display (e.g., the device displays the user's new message). The device also sends (470) instructions to display a third message consisting of the one or more symbols on respective client devices corresponding to each user in the first predefined plurality of users that is logged into the first session (e.g., client device 102-1 sends client devices 102-2 . . . 102-*n*, which are associated with user session 336-1, instructions to display the user's new message via server system 106).

Messages 343 sent by users of the session 336 are independent of respective digital images or videos 341 uploaded to the session. Accordingly, in some embodiments, a digital image or video other than the first digital image or video is displayed (462) on the display when sending the third message (e.g., the user can send a message to the other users of the session regardless of which digital image or video is displayed on their client device or the recipient's client device).

The application 250 also includes an image and video capture mode 256, which the user enters by selecting an icon 508 corresponding to the capture mode 256. Accordingly, in some embodiments, where the first electronic device (e.g., client device 102) further includes a digital camera (e.g., image capture device(s) 211). The device displays (472) a second user input icon corresponding to a digital image capture mode of the messaging application (e.g., icon 508 in FIGS. 5A-5D is displayed when the application 250 is in the first display mode 254). Responsive to detecting a third user input at a location on the display corresponding to display of the second user input icon (e.g., when the user taps icon 508), the device enters (473) a digital image capture mode 257, activates (474) the digital camera 211, and displays (475) a real-time image of the digital camera's 211 view-field. For example, in response to the user tapping on icon 508 in FIG. 5H, client device 102 displays an image 544 of the activated camera's view-field on display 202 in FIG. 5K.

The user can then capture a new image or video 341. Accordingly, in some embodiments, in response to detecting a fourth user input corresponding to an instruction to capture an image or video (e.g., a tap on image capture icon 526 in FIG. 5K), the device acquires (476) a third digital image or video (e.g., the device captures an image or video 341-6 of the girl illustrated in FIG. 5K).

In some embodiments, the acquired third digital image or video is a digital video (477). In some embodiments, a maximum length of the acquired digital video is predetermined (478) by the messaging application (e.g., as described above). In some embodiments, the application 250 provides the user with a real-time indication of the length of the video being captured. For example, status bar 528 in FIG. 5K is continuously updated while the user is capturing a digital video, to reflect the status of the recording. E.g., when status bar 528 is full, the predetermined length requirement has been met and the video capture device 211 stops recording. For example, in some embodiments, the application 250 allows the user to capture videos up to ten seconds long. While recording the video, the status bar 528 make a quarter revolution around the acquisition icon 526 every 2.5 seconds.

After capturing the new digital image or video, the device replaces display (479) of the real-time image of the digital camera's view-field with display of the third digital image or video. For example, after capturing digital image or video 341-6 in FIG. 5K, the device replaces real-time display of view-field 544 with digital image or video 341-6 in FIG. 5L. The device also displays (480) a prompt to post the third digital image or video to the first session. For example, the device 102 displays message 542 in FIG. 5L, informing the user that the new digital image or video 341-6 can be uploaded to the session 336. The device 102 also displays icon 540 associated with the action of uploading the new digital image or video 341-6 to the active session 336. In some embodiments, the device 102 also displays an icon (e.g., icon 538 in FIG. 5L) associated with the action of returning to the real-time view-field display (e.g., as exemplified in FIG. 5K), where a new digital image or video can be captured, without uploading the acquired digital image or video 341-6.

The user decides whether to post the acquired digital image or video 341-6 to the session or take a new image or video by selecting one of icons 540 or 538, respectively. Accordingly, in some embodiments, responsive to detecting a fifth user input (481), while displaying the prompt to upload the third digital image or video to the first session (e.g., when viewing the newly acquired image or video 341-6 in FIG. 5L): in accordance (482) with a determination that the fifth user input corresponds to a request to post the third digital image or video (e.g., when the user taps upload icon 540 in FIG. 5L): the device sends (483) instructions to display a third image icon (e.g., image icon 504-6) associated with the third digital image or video (e.g., digital image or video 341-6) on respective client devices corresponding to each user in the first predefined plurality of users (e.g., client device 102-1 sends client devices 102-2 . . . 102-n, which are associated with user session 336-1, instructions to display an image icon corresponding to new digital image or video 341-6 via server system 106). The device then re-enters (484) the first messaging display mode (e.g., first display modality 254).

In some embodiments, the user has the option to add a caption to the digital image or video when posting it to the session. The caption is then displayed when the client devices 102 associated with the users of the session are displaying the corresponding digital image or video. In some embodiments, display of captions associated with respective digital images or videos are not replaced by messages posted to the session later (e.g., the caption is always displayed when the corresponding digital image or video is displayed).

Alternatively, in accordance with a determination that the fifth user input corresponds to a request not to post the third digital image or video (e.g., when the user taps on icon 534, selecting not to post the acquired digital image or video 341-6 to the session 336), the device replaces display (485) of the third digital image or video (e.g., acquired digital image or video 341-6) with display of the real-time image of the digital camera's 211 view-field (e.g., image 544). For example, when the user doesn't want to post the acquired digital image or video 341-6 in FIG. 5L, the user taps on icon 538 and the device 102 returns to an active capture modality, as exemplified in FIG. 5K.

The application 250 also includes a second display modality 255 that displays more messages than the first display modality 254, but occludes more of the selected digital image or video 341. Accordingly, in some embodiments, the first predefined plurality of users have collectively directed a first plurality of messages to the first session (e.g., the users of session 336-1 have uploaded at least 99 messages in FIG. 5D, as indicated by the message counter in icon 512), including the first and second messages (e.g., messages 343-1, 343-2, and 343-3 in FIG. 5D). The predefined plurality of users have also collectively uploaded a first plurality of images or videos to the first session, including the first and second digital images or videos (e.g., digital images or videos 341-1 through 341-6, as indicated by image icons 504-1 through 501-6 in FIG. 5D). While in the first messaging display mode 254, the device displays (486) a first predefined number of messages in the plurality messages (e.g., device 102 displays three of the 99 messages while in the first display mode 254 in FIG. 5D), a digital image or video in the plurality of digital images or videos (e.g., digital image or video 341-3), and a display toggle icon (e.g., icon 512, including a message counter) corresponding to a second messaging display mode 255 of the messaging application. Responsive to detecting a sixth user input at a location on the display corresponding to display of the display toggle icon (e.g., when the user taps on toggle icon 512), the device enters (487) the second messaging display mode 255, including display of a second predefined number of messages in the first plurality of messages (e.g., as exemplified in FIG. 5F). Each respective message in the second predefined number of messages is displayed at a location on the display corresponding to display of the displayed digital image or video (e.g., the messages 341 are displayed over digital image or video 341-3 in FIG. 5F). The second predefined number of messages is greater than the first predefined number of messages (e.g., more messages 341 are displayed in FIG. 5F than in FIG. 5D).

In some embodiments, while in the first messaging display mode 254, the application 250 directs (488) the electronic device to display the last three messages in the first plurality of messages that had been communicated to the first session by the first plurality of predefined users (e.g., only the last three directed messages 341 are displayed in FIG. 5D). In some embodiments, while in the second messaging display mode 255, the application 250 directs (489) the first electronic device to display the last N messages in the first plurality of messages that had been communicated to the first session, at different locations on the display, wherein N is a positive integer large enough to ensure that the last N messages cover substantively all of the display. For example, in FIG. 5F, substantially the entire digital image or video 341-3 is covered with messages 343 associated with the first session 336-1.

The application 250 also includes a session selection mode 252, where the user may navigate between messaging sessions 336-1 . . . 336-K. Accordingly, in some embodiments, while in the first messaging display mode 254, the device displays (490) an exit icon (e.g., exit icon 509 in FIGS. 5A-5D) associated with logging-out of a session 336. Responsive to detecting a seventh user input at a location corresponding to display of the exit icon on the display (e.g., when the user taps exit icon 509), the device enters (491) a session selection mode 252 (e.g., as exemplified in FIG. 5I). The session selection mode 252 includes a list of sessions 336 of the messaging application associated with the user of the electronic device 102, including a second session and a third session of the messaging application (e.g., icons 536-2 through 536-7 corresponding to sessions 336-2 through 336-7 in FIG. 5I). The second session (e.g., session 336-2) is established by a second originator of the second session and includes a second predefined plurality of users identified by the second originator upon initiation of the second session (e.g., session 536-2 "Besties" includes danielle and elena, as indicated by icon 536-2 in FIG. 5I). The second originator is in the second predefined plurality of users. The second predefined plurality of users have collectively directed a second plurality of messages 343 to the second session 336-2. The second predefined plurality of users have collectively uploaded a second plurality of digital images or videos 341 to the second session 336-2.

In some embodiments, while in the session selection mode 252 (e.g., as exemplified in FIG. 5I), responsive to detecting an eighth user input at a location corresponding to display of the second session 336-2 of the messaging application (e.g., when the user taps icon 536-2), the device enters (492) the first messaging display mode 254 (e.g., of session 336-2). In the first display mode 254, the device displays (493) a fourth digital image or video 336 (e.g., associated with the second session) on the display from the second plurality of images or videos. The device also displays (494) the messages 336 in the second plurality of messages most recently received by the second session at a location on the display corresponding to display of the fourth digital image or video (e.g., the last few messages posted to the "Besties" session 336-2).

The application also includes a session initiation mode 251 (e.g., as exemplified in FIG. 5J), where the user can form a new session and invite friends (e.g., other users of application 250) to participate. Accordingly, in some embodiments, prior to displaying a first digital image on the display, the device establishes (495) the first session of the messaging application (e.g., session 336-1). In some embodiments, establishing the session includes naming (496) the session (e.g., the user is naming a new session "Lip Syn . . . " in FIG. 5J); selecting (497) the first predefined plurality of users for the session 336-2, acquiring (498) the first digital image 336 (e.g., via image and video capture module 257 or selected from a user data store 270 on the client device 102), and sending (499) instructions to create the first session 336-1 on respective client devices 102 corresponding to each user in the first predefined plurality of users (e.g., client device 102-1 sends a request to messaging server module 108 to create the new session and provide access to the selected plurality of users of other client devices 102-i, when they log into severer system 106). The first digital image or video 341 is displayed on the respective client devices (e.g., devices 102-n, corresponding to the selected users) upon logging-in to the first session 336-1 for the first time.

In some embodiments, the originator may create a session without posting a digital image or video to the session. For example, the originator identifies the users of the session and the title of the session, but doesn't post a digital image or video. In this fashion, the originator suggests a topic to the identified users of the session, who may then share digital images or videos with the group.

It should be understood that the particular order in which the operations in FIGS. 4A-4K have been described is merely exemplary and is not intended to indicate that the described order is the only order in which the operations could be performed. One of ordinary skill in the art would recognize various ways to reorder the operations described herein.

Attention is now directed towards embodiments of user interfaces ("UI") and associated processes that may be implemented on an electronic device, such as client device 102, with a display 202. While the following examples are given primarily with reference to inputs at a touch-sensitive display (e.g., finger or stylus contacts), it should be understood that, in some embodiments, one or more of the inputs at the touch-sensitive display are replaced with input from another input device (e.g., mouse-based or track pad-based inputs). As an example, a finger contact is, optionally, replaced with a mouse click while a focus selector is displayed at a location on the display corresponding to the finger contact (e.g., instead of detection of the contact followed by ceasing to detect the contact).

FIGS. 5A-5L illustrate exemplary user interfaces for blending videos, images, and messages in a texting environment, in accordance with some embodiments. The user interfaces in these figures are used to illustrate the processes described above, including the processes in FIGS. 4A-4K. Although some of the examples which follow will be given with reference to inputs on a touch-screen display (where the display 202 is a touch-sensitive surface), in some embodiments, the device detects inputs on a touch-sensitive surface 451 that is separate from the display 202, or other input device (e.g., a mouse or track-ball).

FIGS. 5A-5D, 5G, and 5H illustrate exemplary user interfaces for simultaneously sharing digital images/videos 341 and messages 341 within a predefined group of users, in a first display modality 254. The user interface includes icons 504 corresponding to each of the digital images and videos 341 uploaded to the active session 336 of the messaging application 250. The interface also includes messages 343 that were recently directed to the messaging session 336. In the first image display modality 254, the device displays a limited number of messages associated with the session over the selected digital image or video 341 (e.g., as illustrated in FIGS. 5B-5D). Image icons 504, which are also displayed over the selected digital image or video 341 (e.g., as illustrated in FIGS. 5B-5D), allow the user to navigate through all of the digital images and videos 341 uploaded to the session 336, e.g., without losing display of the messages 343 recently directed to the session. Additionally, the user interface includes icons for entering into different modalities of the application. Text prompt 502 corresponds with a message input modality 256, exemplified in FIG. 5E. Display toggle 512 corresponds to a second display modality 255, exemplified in FIG. 5F. Exit icon 509 corresponds to a session selection modality, exemplified in FIG. 5I. Capture icon 508 corresponds to an image and video capture modality, exemplified in FIGS. 5K and 5L. In some embodiments, a user interface for a first message display modality 254 includes a digital image or video identification icon 510, which identifies the user who uploaded the digital image or video being displayed on the device 102.

FIG. 5E illustrates an exemplary user interface for sending new messages 343 to other users of the session 336, in a message input modality 256. The interface includes a keyboard prompt 516 for inputting messages to the other users. The interface also includes a text prompt 503, for previewing a message 343 being composed prior to directing the message to the session 336 (e.g., to the other users of the session 336). The user interface also includes messages 343 that were recently directed to the session 336 by users of the session. The user interface also includes exit icon 514, which allows the user to return to the first message display modality 254, exemplified in FIGS. 5A-5D, 5G, and 5H.

FIG. 5F illustrates a second exemplary user interface for simultaneously sharing digital images/videos 341 and messages 341 within a predefined group of users, in a second display modality 255. The user interface includes messages 343 that were recently directed to the messaging session 336. In the second image display modality 255, the device displays more messages 343 over the selected digital image or video 341-3 than in the first image display modality 254. Additionally, the user interface includes icons for entering into different modalities of the application. Text prompt 502 corresponds with a message input modality 256, exemplified in FIG. 5E. The user interface also includes exit icon 518, which allows the user to return to the first message display modality 254, exemplified in FIGS. 5A-5D, 5G, and 5H.

In some embodiments, messages directed to the session from the user logged into the client device 102 are visually distinct from messages sent from other users. For example, as illustrated in FIGS. 5E and 5F, message 343-6, "show me what you got," is offset to the right of the screen, does not include a user identification, and is shaded in a different color that the other messages. In some embodiments, visual distinctions between the messages sent by the active user and those sent by other users within the group are included in each modality of the application 250 in which messages are displayed.

Figure 5I:
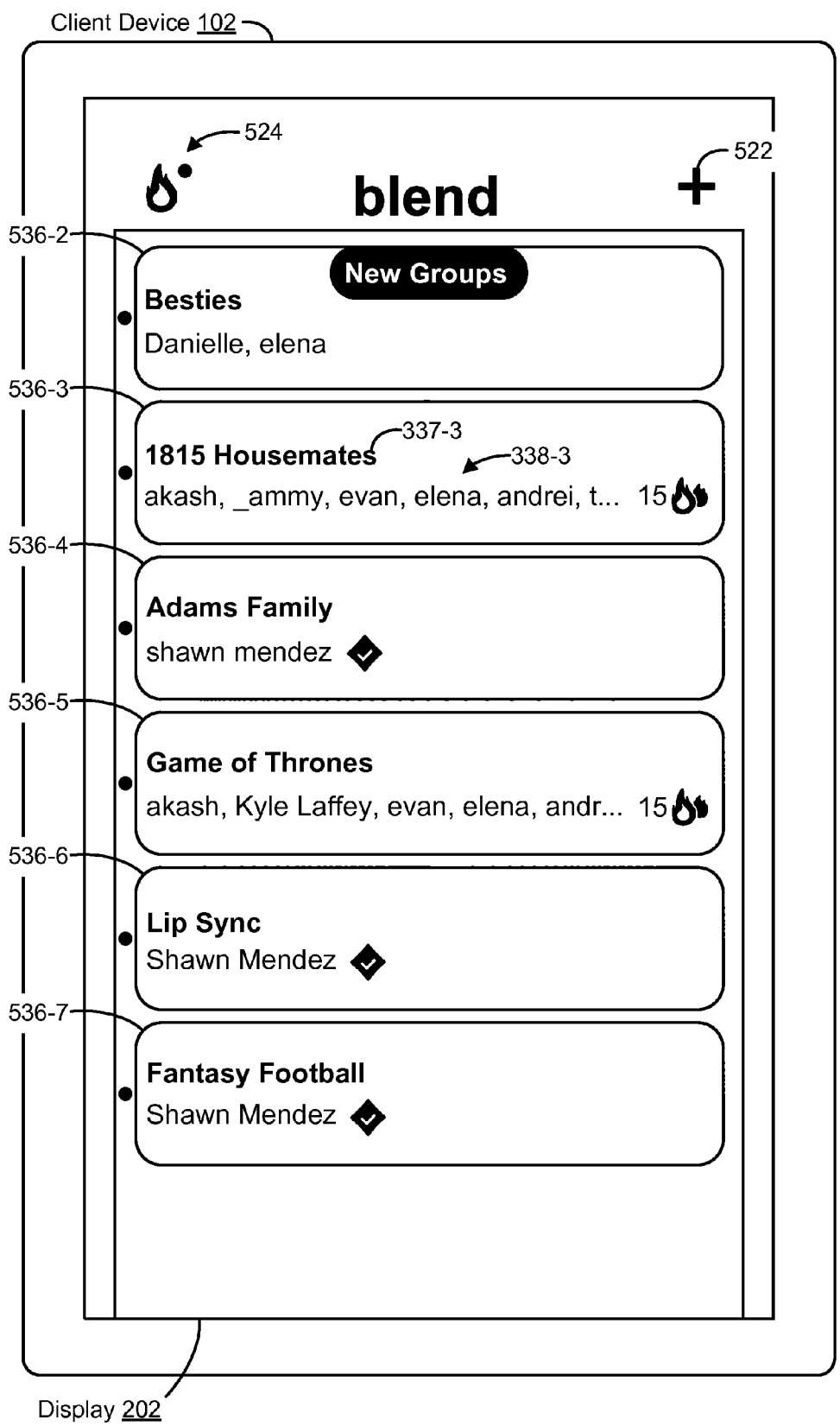

FIG. 5I illustrates an exemplary user interface for navigating between messaging sessions 336 in a session selection modality 252. The user interface includes icons 536 that provide information about the messaging sessions 336 associated with the user of the device 102 (e.g., the name of the session 336 and the identities of the other users of the respective session). The user interface also includes a session creation icon 522, which allows the user to create a new messaging session, by entering a session initiation module 251, exemplified in FIG. 5J. The user interface also includes a contact acquisition icon 524, which allows the user to select other users (e.g., contacts 277 from contact list 276 in memory 220 of client device 102, as illustrated in FIG. 2) for inclusion in the new session 336.

Figure 5J:
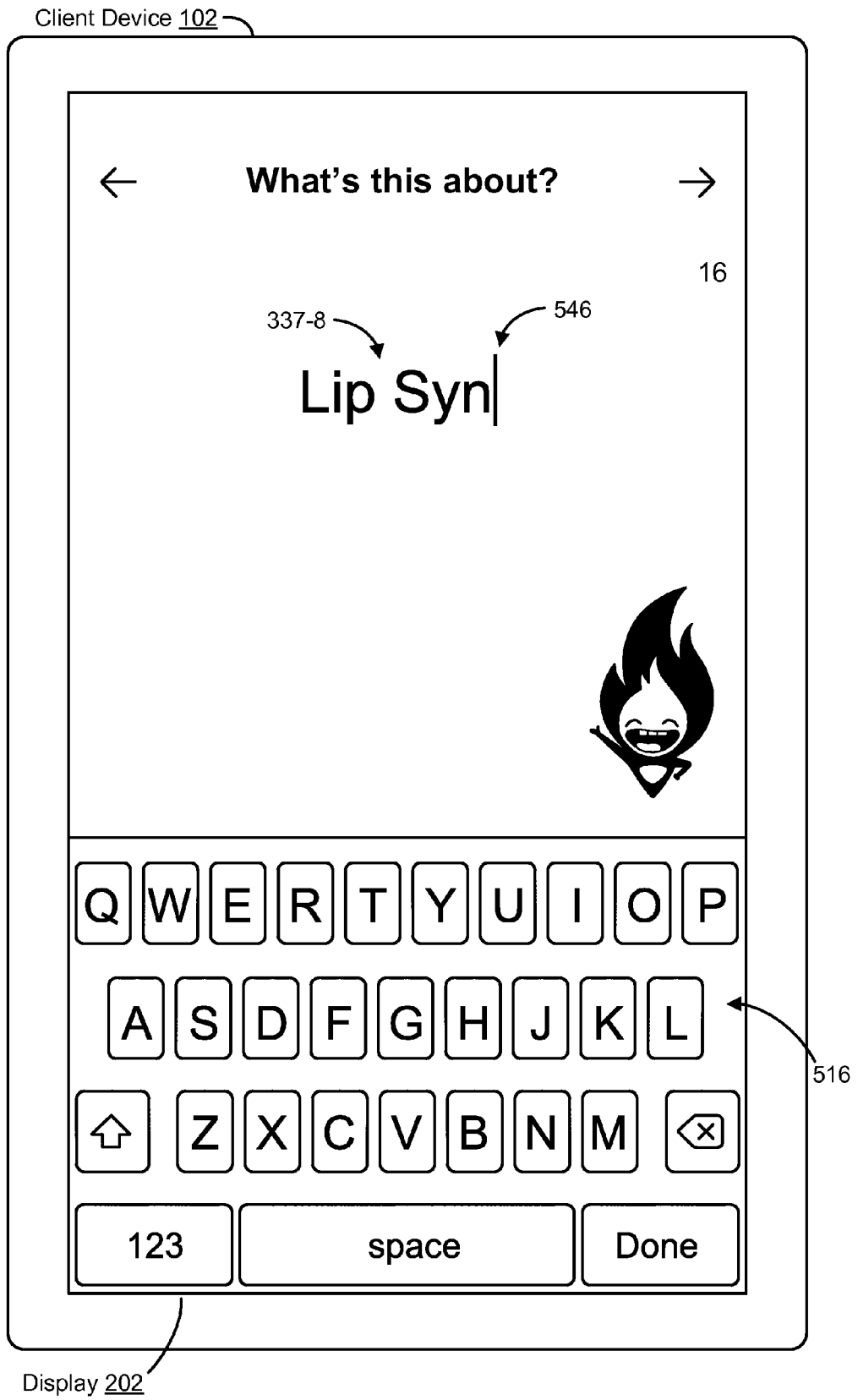
Figure 5K:
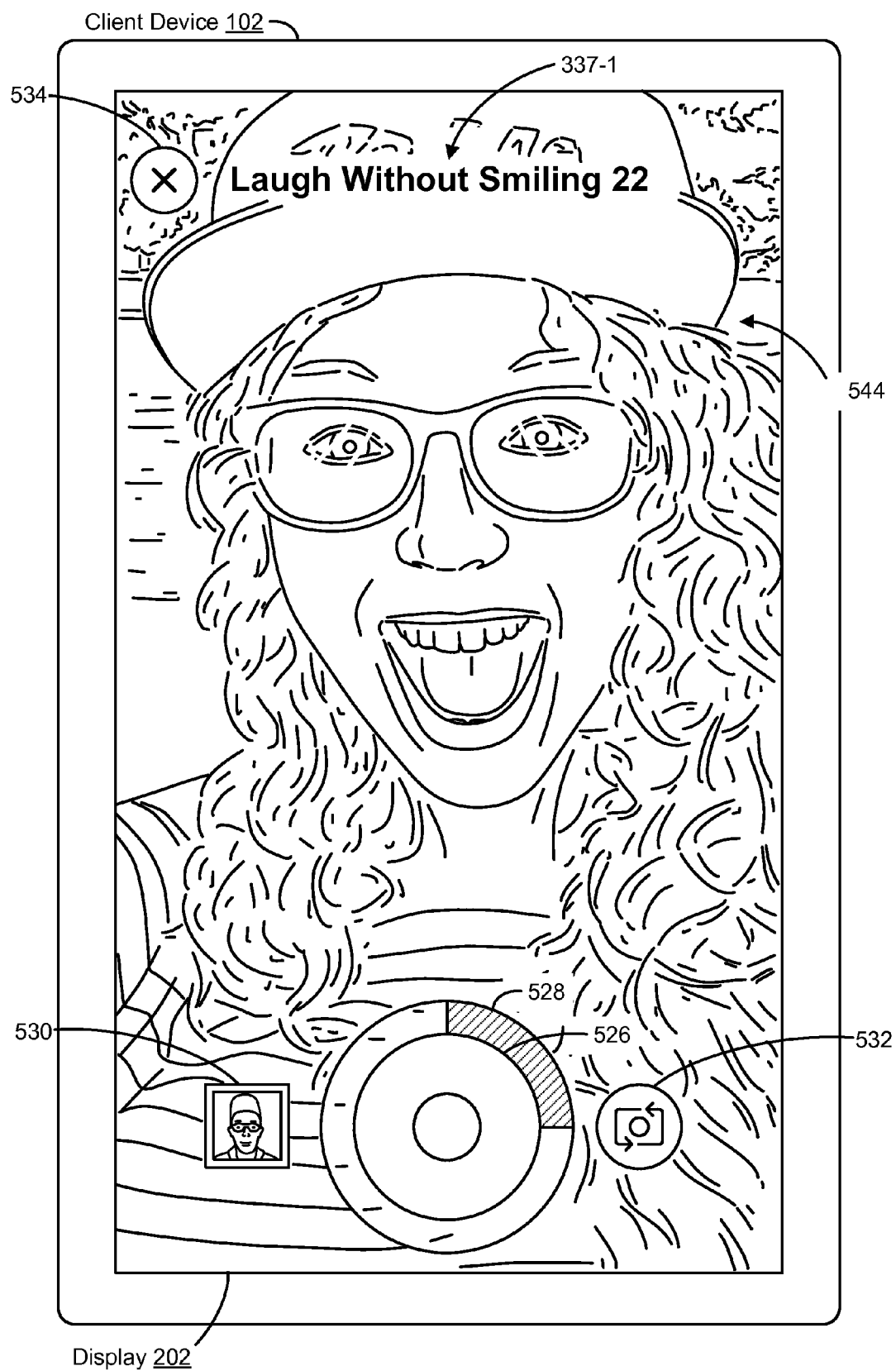
Figure 5L:
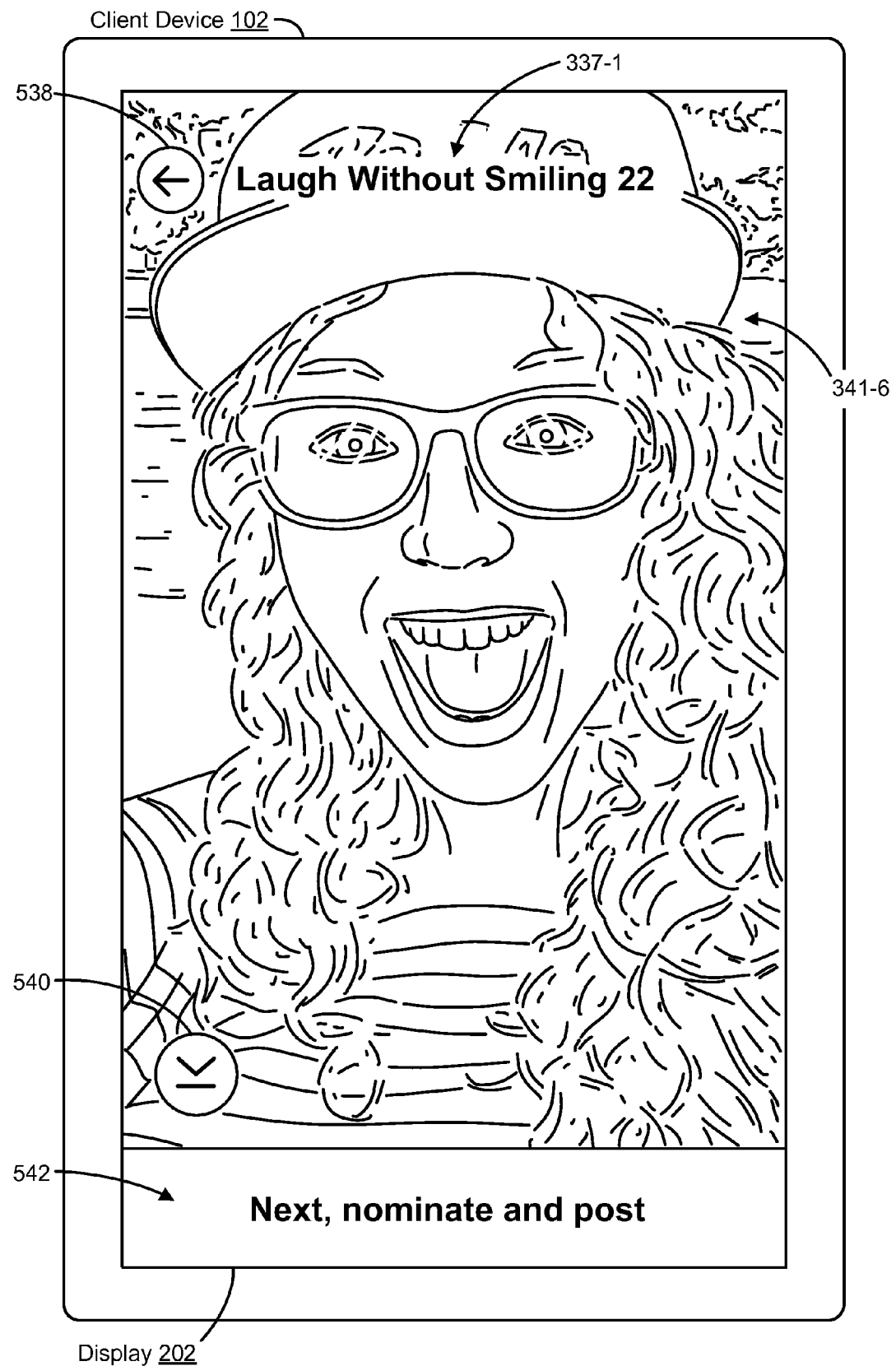

FIG. 5J illustrates an exemplary user interface for creating a new messaging session 336, in a session initiation modality 251. The user interface includes a keyboard prompt 516 for inputting information about the new session (e.g., a session name 337 and the identity of associated users 338). The user interface also includes a text prompt 546 for previewing information being inputted, prior to finalizing.

In some embodiments, the user selects multiple users for the session and is then prompted to select how to share videos and messages within the group. In a first option, all users of the group share digital images, videos, and messages with all other users of the session. In a second option, the user shares digital images, videos, and messages one-on-one with a selected user in the session.

FIGS. 5K and 5J illustrate exemplary user interfaces for capturing new digital images and videos, in an image and video capture modality 257. In a first exemplary capture user interface (FIG. 5K), the device displays a real-time image 544 of the view-field of an activated image/video capture device 211 associated with the client device 102. The user interface also includes a capture icon 526 for initiating acquisition of a digital image or video 341 and a video status bar 528 for tracking the length of a digital video being acquired in real-time. In some embodiments, video status bar 528 is only displayed when actively recording a video.

In some embodiments, the device captures a digital image in response to the user tapping (e.g., executing a short selection contact) acquisition icon 526. In some embodiments, the device captures a digital movie in response to the user pressing and holding acquisition icon 526 (e.g., executing a long selection contact). For example, the device captures a digital video having a length equal to the time the user selects the acquisition icon 526, optionally capped at a predetermined maximum video length requirement. The user interface also includes a capture modality toggle icon 532 for toggling between multiple image capture devices 211 associated with the client device 102 (e.g., forward facing and backward facing cameras on a smart phone). The interface also includes a digital image or video selection icon 530 for selecting a previously acquired digital image 273 or digital video 275 from a digital image store 272 or digital movie store 274 stored in memory 220 of client device 102 (e.g., as shown in FIG. 2). The interface also includes an exit icon 534, which allows the user to return to the first message display modality 254, exemplified in FIGS. 5A-5D, 5G, and 5H.

In a second exemplary capture user interface (FIG. 5L), the device displays a digital image or video 341-6 recently acquired in the image and video capture modality 257. The user interface also includes prompts 540 and 542 for uploading the recently captured digital image or video 341-6 to the active messaging session 336. The user interface also includes a back icon 538, which allows the user to return to the active camera acquisition mode (exemplified in FIG. 5K) without uploading the recently acquired digital image or video 341-6.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   in accordance with a messaging application on a first electronic device, the first electronic device comprising one or more processors, memory, and a display:
   (A) displaying a first digital image or video on the display, while the messaging application is in a first messaging display mode, the first digital image or video associated with a first session of the messaging application, wherein the first session is established by a first originator of the first session and includes a first predefined plurality of users identified by the first originator upon initiation of the first session, wherein the first originator is in the first predefined plurality of users;
   (B) responsive to receiving, at a time when the first digital image or video is displaying, a first message specifically designated for the first session from a first user in the first predefined plurality of users, displaying the first message at a first location of the display that overlays the first digital image or video;
   (C) responsive to receiving, at a time when the first digital image or video is displaying, a second message specifically designated for the first session from a second user in the first predefined plurality of users:
      (i) displacing display of the first message with display of the second message at the first location, and
      (ii) displaying the first message at a second location on the display that overlays the first digital image or video;
   (D) displaying, at a time when the first digital image or video is displaying, a first image icon corresponding to the first digital image or video at a third location on the display that overlays the first digital image or video;
   (E) responsive to receiving a second digital image or video from a third user in the first predefined plurality of users, displaying a second image icon corresponding to the second digital image or video at a fourth location on the display that overlays the first digital image or video; and
   (F) responsive to detecting a first user input at a location corresponding to display of the second image icon at a time when the first digital image or video is displaying, the first and second messages are displayed, and the first and second image icons are displayed:

(i) displacing display of the first digital image or video with display of the second digital image or video, (ii) maintaining display of the first and second messages through the displacing display of the first digital image or video with display of the second digital image or video, and (iii) maintaining display of the first and second image icons through the displacing display of the first digital image or video with display of the second digital image or video, wherein the first session persists across periods of time when at least a subset of the first predetermined plurality of users are logged out of the first session, such that when the second digital image or video is posted to the first session by the third user at a time when the first user has logged out of the first session, the second digital image or video may be retrieved by the first user within the first session when the first user logs back into the first session, regardless of whether the third user is concurrently logged into the first session.

2. The method of claim 1, wherein the first digital image or video is a first digital video.

3. The method of claim 2, wherein displaying the first digital video includes playing the video on a recurring basis on the display without human intervention.

4. The method of claim 1, wherein the first predefined plurality of users have collectively uploaded a first plurality of digital images or videos to the first session, including the first and second digital image or video, the method further comprising:

sequentially displaying the first plurality of digital images or videos, based on the temporal order in which they were uploaded to the first session.

5. The method of claim 1, wherein the first predefined plurality of users have collectively uploaded a first plurality of digital images or videos to the first session, including the first and second digital image or video, the method further comprising:

while the first electronic device is logged into a first instance of the first session, displaying a respective digital image or video in the first plurality of digital images or videos in an asynchronous manner, such that the identity of the respective digital image or video being displayed at a given time for the first user is independent of the identity of a respective digital image or video in the first plurality of digital images or videos being displayed contemporaneously at a second instance of the first session that is associated with a second user in the first predefined plurality of users.

6. The method of claim 1, wherein the first predefined plurality of users have collectively uploaded a first plurality of digital images or videos to the first session, including the first and second digital image or video, further wherein:

each digital image or video in the first plurality of digital images or videos is associated with an image icon in a first plurality of image icons, the first plurality of image icons including the first image icon and the second image icon, a subset of the first plurality of image icons are displayed across a characteristic sub-region of the display in a predetermined fashion, based on the temporal order in which they were uploaded to the first session, wherein the subset always includes an image icon corresponding to the digital image or video that is currently being displayed, each image icon is associated with an active state and an inactive state, the active state of a respective image icon in the plurality of image icons is displayed when the digital image or video corresponding to the respective image icon is being displayed on the display of the first electronic device, and the inactive state of a respective image icon in the plurality of image icons is displayed when the respective image icon is in the subset of image icons and the image or icon corresponding to the respective image icon is not presently being displayed on the display of the first electronic device.

7. The method of claim 6, wherein display of the inactive state of a representative image icon is brighter before the digital video or image associated with the respective image icon is displayed for the first time on the first electronic device than after the corresponding digital image or video has been displayed.

8. The method of claim 1, wherein the first predefined plurality of users have collectively directed a first plurality of messages to the first session, including the first and second messages, the method further comprising:

while the first electronic device is logged into a first instance of the first session, displaying at least the last M messages in the first plurality of messages that had been directed to the first session by the first plurality of predefined users without human intervention in a synchronous manner, such that the identity of the M messages in the first plurality of messages being displayed at a given time in the first instance of the first session is the same as the identity of the M messages in the first plurality of messages displayed at contemporaneously at the second instance of the first session.

9. The method of claim 8, wherein the value of M is dependent on a display mode of the messaging application.

10. The method according to claim 1, wherein displaying the first message includes displaying a user identification associated with the first user.

11. The method of claim 10, wherein each user in the first plurality of users is associated with a unique user name and color within the first session, and displaying the user identification associated with the first user includes displaying the respective user name associated with the first user in the respective color associated with the first user.

12. The method of claim 1, wherein the first predefined plurality of users cannot be changed after the originator establishes the first session.

13. The method of claim 1, wherein the first and second locations are within a first sub-region of the display corresponding to display of the first digital image or video, the first sub-region consisting of less than the entire display of the first digital image or video.

14. The method of claim 13, wherein the messages displayed within the first sub-region of the display fade based on the temporal order in which they were uploaded to the first session by users in the first plurality of users.

15. The method of claim 13, wherein the third and fourth locations are within a second sub-region of the display corresponding to display of the first digital image or video, and wherein the first and second sub-regions of the display do not overlap.

16. The method of claim 1, wherein when the first electronic device is logged-off of the first session when the first message is received, display of the first message is initiated upon logging-in to the first session.

17. The method of claim 1, further comprising:

while displaying a digital image or video associated with the first session of the messaging application and the first and second messages:

displaying a first user input icon on the display, the first user input icon corresponding to a messaging input mode of the messaging application;

responsive to detecting a second user input at a location corresponding to display of the first user input icon, entering the messaging input mode of the messaging application and displaying a keyboard prompt at a sixth location on the display;

responsive to detecting one or more user inputs corresponding to selection of keys on the keyboard as well as a termination key:

(i) displaying one or more symbols corresponding to the selected keys on the keyboard prompt on the display, and (ii) sending instructions to display a third message comprising the one or more symbols on respective client devices corresponding to each user in the first predefined plurality of users that is logged into the first session.

18. The method of claim 17, wherein the first user is viewing a digital image or video other than the first digital image or video when sending the third message.

19. The method of claim 1, wherein the first electronic device further comprises a digital camera, the method further comprising:

displaying a second user input icon corresponding to a digital image capture mode of the messaging application;

responsive to detecting a third user input at a location on the display corresponding to display of the second user input icon, entering a digital image capture mode, including:

activating the digital camera; and displaying a real-time image of the digital camera's view-field;

while the messaging application is in the digital image capture mode:

in response to detecting a fourth user input corresponding to an instruction to capture an image or video, acquiring a third digital image or video;

replacing display of the real-time image of the digital camera's view-field with display of the third digital image or video;

displaying a prompt to post the third digital image or video to the first session;

responsive to detecting a fifth user input, while displaying the prompt to upload the third digital image or video to the first session:

in accordance with a determination that the fifth user input corresponds to a request to post the third digital image or video:

sending instructions to display a third image icon associated with the third digital image or video on respective client devices corresponding to each user in the first predefined plurality of users, and re-entering the first messaging display mode; and in accordance with a determination that the fifth user input corresponds to a request not to post the third digital image or video, replacing display of the third digital image or video with display of the real-time image of the digital camera's view-field.

20. The method of claim 19, wherein the acquired third digital image or video is a digital video.

21. The method of claim 20, wherein a maximum length of the acquired digital video is predetermined by the messaging application.

22. The method according to claim 1, wherein the first predefined plurality of users have collectively directed a first plurality of messages to the first session, including the first and second messages, and wherein the predefined plurality of users have collectively uploaded a first plurality of images or videos to the first session, including the first and second image or video, the method further comprising:

while in the first messaging display mode:

displaying a first predefined number of messages in the plurality messages and a digital image or video in the plurality of digital images or videos, displaying a display toggle icon corresponding to a second messaging display mode of the messaging application;

responsive to detecting a sixth user input at a location on the display corresponding to display of the display toggle icon, entering the second messaging display mode, including display of a second predefined number of messages in the first plurality of messages, wherein each respective message in the second predefined number of messages is displayed at a location on the display corresponding to display of the displayed digital image or video, and wherein the second predefined number of messages is greater than the first predefined number of messages.

23. The method of claim 22, wherein:

while in the first messaging display mode, the messaging application directs the electronic device to display the last three messages in the first plurality of messages that had been communicated to the first session by the first plurality of predefined users; and while in the second messaging display mode, the messaging application directs the first electronic device to display the last N messages in the first plurality of messages that had been communicated to the first session, at different locations on the display, wherein N is a positive integer large enough to ensure that the last N messages cover substantively all of the display.

24. The method of claim 1, further comprising:

while in the first messaging display mode:

displaying an exit icon associated with logging-out of a session;

responsive to detecting a seventh user input at a location corresponding to display of the exit icon on the display, entering a session selection mode, including, display of a list of sessions of the messaging application associated with the user of the electronic device, including a second session and a third session of the messaging application, wherein:

the second session is established by a second originator of the second session and includes a second predefined plurality of users identified by the second originator upon initiation of the second session, the second originator is in the second predefined plurality of users, the second predefined plurality of users have collectively directed a second plurality of messages to the second session, and the second predefined plurality of users have collectively uploaded a second plurality of images or videos to the second session;

while in the session selection mode:
responsive to detecting an eighth user input at a location corresponding to display of the second session of the messaging application, entering the first messaging display mode, including:
displaying a fourth digital image or video on the display from the second plurality of images or videos; and
displaying the messages in the second plurality of messages most recently received by the second session at a location on the display corresponding to display of the fourth digital image or video.

25. The method of claim 1, further comprising:
prior to displaying a first digital image on the display, establishing the first session of the messaging application, including:
naming the first session;
selecting the first predefined plurality of users for the session;
acquiring the first digital image; and
sending instructions to create the first session on respective client devices corresponding to each user in the first predefined plurality of users, wherein the first digital image is displayed on the respective client devices upon logging-in to the first session for the first time.

26. A computer system for running a messaging application, the computer system comprising at least one processor, a display, and memory storing at least one program for execution by the at least one processor, the at least one program comprising instructions for:
(A) displaying a first digital image or video on the display, while the messaging application is in a first messaging display mode, the first digital image or video associated with a first session of the messaging application, wherein the first session is established by a first originator of the first session and includes a first predefined plurality of users identified by the first originator upon initiation of the first session, wherein the first originator is in the first predefined plurality of users;
(B) responsive to receiving, at a time when the first digital image or video is displaying, a first message specifically designated for the first session from a first user in the first predefined plurality of users, displaying the first message at a first location of the display that overlays the first digital image or video;
(C) responsive to receiving, at a time when the first digital image or video is displaying, a second message specifically designated for the first session from a second user in the first predefined plurality of users:
(i) displacing display of the first message with display of the second message at the first location, and
(ii) displaying the first message at a second location on the display that overlays the first digital image or video;
(D) displaying, at a time when the first digital image or video is displaying, a first image icon corresponding to the first digital image or video at a third location on the display that overlays the first digital image or video,
(E) responsive to receiving a second digital image or video from a third user in the first predefined plurality of users, displaying a second image icon corresponding to the second digital image or video at a fourth location on the display that overlays the first digital image or video; and
(F) responsive to detecting a first user input at a location corresponding to display of the second image icon at a time when the first digital image or video is displaying, the first and second messages are displayed, and the first and second image icons are displayed:
(i) displacing display of the first digital image or video with display of the second digital image or video,
(ii) maintaining display of the first and second messages through the displacing display of the first digital image or video with display of the second digital image or video, and
(iii) maintaining display of the first and second image icons through the displacing display of the first digital image or video with display of the second digital image or video,
wherein the first session persists across periods of time when at least a subset of the first predetermined plurality of users are logged out of the first session, such that when the second digital image or video is posted to the first session by the third user at a time when the first user has logged out of the first session, the second digital image or video may be retrieved by the first user within the first session when the first user logs back into the first session, regardless of whether the third user is concurrently logged into the first session.

27. A non-transitory computer readable storage medium storing a messaging application, the messaging application comprising instructions for:
(A) displaying a first digital image or video on the display, while the messaging application is in a first messaging display mode, the first digital image or video associated with a first session of the messaging application, wherein the first session is established by a first originator of the first session and includes a first predefined plurality of users identified by the first originator upon initiation of the first session, wherein the first originator is in the first predefined plurality of users;
(B) responsive to receiving, at a time when the first digital image or video is displaying, a first message specifically designated for the first session from a first user in the first predefined plurality of users, displaying the first message at a first location of the display that overlays the first digital image or video;
(C) responsive to receiving, at a time when the first digital image or video is displaying, a second message specifically designated for the first session from a second user in the first predefined plurality of users:
(i) displacing display of the first message with display of the second message at the first location, and
(ii) displaying the first message at a second location on the display that overlays the first digital image or video;
(D) displaying, at a time when the first digital image or video is displaying, a first image icon corresponding to the first digital image or video at a third location on the display that overlays the first digital image or video,
(E) responsive to receiving a second digital image or video from a third user in the first predefined plurality of users, displaying a second image icon corresponding to the second digital image or video at a fourth location on the display that overlays the first digital image or video; and
(F) responsive to detecting a first user input at a location corresponding to display of the second image icon at a time when the first digital image or video is displaying, the first and second messages are displayed, and the first and second image icons are displayed:
(i) displacing display of the first digital image or video with display of the second digital image or video,
(ii) maintaining display of the first and second messages through the displacing display of the first digital image or video with display of the second digital image or video, and
(iii) maintaining display of the first and second image icons through the displacing display of the first digital image or video with display of the second digital image or video, wherein the first session persists across periods of time when at least a subset of the first predetermined plurality of users are logged out of the first session, such that when the second digital image or video is posted to the first session by the third user at a time when the first user has logged out of the first session, the second digital image or video may be retrieved by the first user within the first session when the first user logs back into the first session, regardless of whether the third user is concurrently logged into the first session.

* * * * *